(12) United States Patent
Lau et al.

(10) Patent No.: US 10,652,690 B2
(45) Date of Patent: *May 12, 2020

(54) METHOD AND APPARATUS FOR IDENTIFYING AND PRESENTING LOCATION AND LOCATION-RELATED INFORMATION

(71) Applicant: IpVenture, Inc., Los Altos, CA (US)

(72) Inventors: Chung Lau, Sunnyvale, CA (US); Peter P. Tong, Mountain View, CA (US); C. Douglass Thomas, Saratoga, CA (US)

(73) Assignee: IpVenture, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/634,019

(22) Filed: Jun. 27, 2017

(65) Prior Publication Data

US 2017/0295462 A1 Oct. 12, 2017

Related U.S. Application Data

(63) Continuation of application No. 14/874,782, filed on Oct. 5, 2015, now Pat. No. 9,723,442, which is a
(Continued)

(51) Int. Cl.
*H04W 4/02* (2018.01)
*G01C 21/00* (2006.01)
(Continued)

(52) U.S. Cl.
CPC .............. *H04W 4/02* (2013.01); *G01C 21/00* (2013.01); *G01C 21/005* (2013.01); *G01C 21/32* (2013.01);
(Continued)

(58) Field of Classification Search
CPC ....... H04W 4/02; H04W 4/021; H04W 4/023; H04W 4/025; H04W 64/00; G01C 21/00;
(Continued)

(56) References Cited

U.S. PATENT DOCUMENTS 3,975,941 A 8/1976 Smith
4,719,920 A 1/1988 Alt et al.
(Continued)

FOREIGN PATENT DOCUMENTS

EP 0 874 529 A2 10/1998
EP 1 037 447 A2 9/2000
(Continued)

OTHER PUBLICATIONS

Danger Product Overview, Danger, Inc., date unknown, 5 pgs.
(Continued)

*Primary Examiner* — Quynh H Nguyen

(57) ABSTRACT

Method and apparatus to analyze and present location information in an easy-to-digest manner are disclosed. In one embodiment, each piece of location information can include a piece of location-designating information and a piece of location-related information. Location-designating information is primarily for identifying location. Location-related information is information related to location-designating information. The location-designating information and the location-related information can be supplied by a mobile device. With the help of location-related information, each piece of location-designating information can be more accurately transformed into a label to help identify a location. The amount of location information can be reduced. All of the location-designating information pertaining to a given area can be consolidated into one piece of location-designating information related to the label. Consolidation of some of the information may not occur if a piece of
(Continued)

location-related information changes by more than a preset value. To better present location information in an easy-to-digest manner, location information can be compared to standards. Presentation can be on a display with respect to a reference location.

55 Claims, 11 Drawing Sheets

Related U.S. Application Data continuation of application No. 14/519,503, filed on Oct. 21, 2014, now Pat. No. 9,219,988, which is a continuation of application No. 13/933,770, filed on Jul. 2, 2013, now Pat. No. 8,886,220, which is a continuation of application No. 11/705,339, filed on Feb. 10, 2007, now Pat. No. 8,611,920, which is a continuation of application No. 10/397,472, filed on Mar. 26, 2003, now Pat. No. 7,218,938, which is a continuation-in-part of application No. 09/797,517, filed on Feb. 28, 2001, now Pat. No. 7,366,522.

(60) Provisional application No. 60/185,480, filed on Feb. 28, 2000, provisional application No. 60/444,198, filed on Jan. 30, 2003, provisional application No. 60/418,491, filed on Oct. 15, 2002, provisional application No. 60/404,645, filed on Aug. 19, 2002, provisional application No. 60/375,998, filed on Apr. 24, 2002.

(51) Int. Cl.
| | | |
|---|---|---|
| *G01C 21/32* | (2006.01) | |
| *G06Q 10/10* | (2012.01) | |
| *H04L 29/08* | (2006.01) | |
| *H04W 4/021* | (2018.01) | |
| *H04W 64/00* | (2009.01) | |
| *G06F 3/0481* | (2013.01) | |
| *G06F 3/0482* | (2013.01) | |
| *H04W 4/029* | (2018.01) | |

(52) U.S. Cl.
CPC ......... *G06F 3/04817* (2013.01); *G06Q 10/10* (2013.01); *H04L 67/02* (2013.01); *H04W 4/021* (2013.01); *H04W 4/023* (2013.01); *H04W 4/025* (2013.01); *H04W 4/029* (2018.02); *H04W 64/00* (2013.01); *G06F 3/0482* (2013.01)

(58) Field of Classification Search
CPC ... G01C 21/005; G01C 21/32; G06F 3/04817; G06Q 10/10; H04L 67/02
USPC .......... 379/201.01; 455/456.2, 456.3, 404.2, 455/414.2, 440
See application file for complete search history.

(56) References Cited

U.S. PATENT DOCUMENTS

| | | | |
|---|---|---|---|
| 5,115,223 | A | 5/1992 | Moody |
| 5,337,579 | A | 8/1994 | Saia, III et al. |
| 5,347,274 | A | 9/1994 | Hassett |
| 5,353,034 | A | 10/1994 | Sato et al. |
| 5,389,934 | A | 2/1995 | Kass |
| 5,394,333 | A | 2/1995 | Kao |
| 5,400,020 | A | 3/1995 | Jones et al. |
| 5,422,814 | A | 6/1995 | Sprague et al. |
| 5,422,816 | A | 6/1995 | Sprague et al. |
| 5,461,365 | A | 10/1995 | Schlager et al. |
| 5,470,233 | A | 11/1995 | Fruchterman et al. |
| 5,491,486 | A | 2/1996 | Welles, II et al. |
| 5,512,902 | A | 4/1996 | Guthrie et al. |
| 5,515,858 | A | 5/1996 | Myllymaki |
| 5,528,247 | A | 6/1996 | Nonami |
| 5,528,518 | A | 6/1996 | Bradshaw et al. |
| 5,532,690 | A | 7/1996 | Hertel |
| 5,539,748 | A | 7/1996 | Raith |
| 5,541,845 | A | 7/1996 | Klein |
| 5,543,789 | A | 8/1996 | Behr et al. |
| 5,550,551 | A | 8/1996 | Alesio |
| 5,563,606 | A | 10/1996 | Wang |
| 5,568,119 | A | 10/1996 | Schipper et al. |
| 5,570,412 | A | 10/1996 | LeBlanc |
| 5,576,716 | A | 11/1996 | Sadler |
| 5,592,173 | A | 1/1997 | Lau et al. |
| 5,598,460 | A | 1/1997 | Tendler |
| 5,604,708 | A | 2/1997 | Helms et al. |
| 5,623,260 | A | 4/1997 | Jones |
| 5,623,418 | A | 4/1997 | Rostoker |
| 5,627,517 | A | 5/1997 | Theimer et al. |
| 5,629,678 | A | 5/1997 | Gargano et al. |
| 5,633,874 | A | 5/1997 | Diachina et al. |
| 5,650,770 | A | 7/1997 | Schlager et al. |
| 5,652,570 | A | 7/1997 | Lepkofker |
| 5,673,692 | A | 10/1997 | Schulze et al. |
| 5,686,888 | A | 11/1997 | Welles, II et al. |
| 5,710,551 | A | 1/1998 | Ridgeway |
| 5,712,619 | A | 1/1998 | Simkin |
| 5,731,757 | A | 3/1998 | Layson, Jr. |
| 5,731,788 | A | 3/1998 | Reeds |
| 5,742,233 | A | 4/1998 | Hoffman et al. |
| 5,751,245 | A | 5/1998 | Janky et al. |
| 5,771,001 | A | 6/1998 | Cobb |
| 5,771,455 | A | 6/1998 | Kennedy, III et al. |
| 5,774,876 | A | 6/1998 | Woolley et al. |
| 5,786,789 | A | 7/1998 | Janky |
| 5,797,091 | A | 8/1998 | Clise et al. |
| 5,806,018 | A | 9/1998 | Smith et al. |
| 5,808,565 | A | 9/1998 | Matta et al. |
| RE35,920 | E | 10/1998 | Sorden et al. |
| 5,825,283 | A | 10/1998 | Camhi |
| 5,826,195 | A | 10/1998 | Westerlage et al. |
| 5,835,907 | A | 11/1998 | Newman |
| 5,841,352 | A | 11/1998 | Prakash |
| 5,844,862 | A | 12/1998 | Cocatre-Zilgien |
| 5,850,196 | A | 12/1998 | Mowers |
| 5,852,775 | A | 12/1998 | Hidary |
| 5,861,841 | A | 1/1999 | Gildea et al. |
| 5,883,594 | A | 3/1999 | Lau |
| 5,889,770 | A | 3/1999 | Jokiaho et al. |
| 5,892,454 | A | 4/1999 | Schipper et al. |
| 5,894,266 | A | 4/1999 | Wood, Jr. et al. |
| 5,902,347 | A | 5/1999 | Backman et al. |
| 5,905,461 | A | 5/1999 | Neher |
| 5,910,799 | A | 6/1999 | Carpenter et al. |
| 5,913,078 | A | 6/1999 | Kimura et al. |
| 5,917,433 | A | 6/1999 | Keillor et al. |
| 5,918,180 | A | 6/1999 | Dimino |
| 5,928,309 | A | 7/1999 | Korver et al. |
| 5,938,721 | A | 8/1999 | Dussell et al. |
| 5,940,004 | A | 8/1999 | Fulton |
| 5,948,040 | A | 9/1999 | DeLorme et al. |
| 5,948,043 | A | 9/1999 | Mathis |
| 5,950,125 | A | 9/1999 | Buhrmann et al. |
| 5,959,575 | A | 9/1999 | Abbott |
| 5,959,577 | A | 9/1999 | Fan et al. |
| 5,963,130 | A | 10/1999 | Schlager et al. |
| 5,982,285 | A | 11/1999 | Bueche et al. |
| 5,982,807 | A | 11/1999 | Snell |
| 5,983,108 | A | 11/1999 | Kennedy, III et al. |
| 5,983,158 | A | 11/1999 | Suzuki et al. |
| 5,991,690 | A | 11/1999 | Murphy |
| 5,995,849 | A | 11/1999 | Williams et al. |
| 6,002,363 | A | 12/1999 | Krasner |
| 6,002,982 | A | 12/1999 | Fry |
| 6,009,319 | A | 12/1999 | Khullar et al. |
| 6,013,007 | A | 1/2000 | Root et al. |
| 6,014,080 | A | 1/2000 | Layson, Jr. |
| 6,014,090 | A | 1/2000 | Rosen et al. |

(56) References Cited

U.S. PATENT DOCUMENTS

| | | |
|---|---|---|
| 6,018,704 A | 1/2000 | Kohli et al. |
| 6,023,241 A | 2/2000 | Clapper |
| 6,031,496 A | 2/2000 | Kuittinen et al. |
| 6,032,051 A | 2/2000 | Hall et al. |
| 6,034,622 A | 3/2000 | Levine |
| 6,052,646 A | 4/2000 | Kirkhart et al. |
| 6,052,696 A | 4/2000 | Euler et al. |
| 6,054,928 A | 4/2000 | Lemelson et al. |
| 6,064,336 A | 5/2000 | Krasner |
| 6,067,018 A | 5/2000 | Skelton et al. |
| 6,067,044 A | 5/2000 | Whelan et al. |
| 6,072,396 A | 6/2000 | Gaukel |
| 6,078,290 A | 6/2000 | McBurney et al. |
| 6,083,248 A | 7/2000 | Thompson |
| 6,083,353 A | 7/2000 | Alexander, Jr. |
| 6,085,090 A | 7/2000 | Yee et al. |
| 6,094,168 A | 7/2000 | Duffett-Smith et al. |
| 6,100,806 A | 8/2000 | Gaukel |
| 6,101,710 A | 8/2000 | Selinger et al. |
| 6,104,334 A | 8/2000 | Allport |
| 6,111,540 A | 8/2000 | Krasner |
| 6,115,595 A | 9/2000 | Rodal et al. |
| 6,121,921 A | 9/2000 | Ishigaki |
| 6,125,325 A | 9/2000 | Kohli et al. |
| 6,131,067 A | 10/2000 | Girerd et al. |
| 6,140,863 A | 10/2000 | Fujisawa |
| 6,140,957 A | 10/2000 | Wilson et al. |
| 6,141,570 A | 10/2000 | O'Neill, Jr. et al. |
| 6,144,303 A | 11/2000 | Federman |
| 6,148,280 A | 11/2000 | Kramer |
| 6,154,422 A | 11/2000 | Shinkawa et al. |
| 6,163,696 A | 12/2000 | Bi et al. |
| 6,169,902 B1 | 1/2001 | Kawamoto |
| 6,171,264 B1 | 1/2001 | Bader |
| 6,172,640 B1 | 1/2001 | Durst et al. |
| 6,175,616 B1 | 1/2001 | Light et al. |
| 6,198,390 B1 | 3/2001 | Schlager et al. |
| 6,198,431 B1 | 3/2001 | Gibson |
| 6,198,930 B1 | 3/2001 | Schipper |
| 6,199,045 B1 | 3/2001 | Giniger et al. |
| 6,204,807 B1 | 3/2001 | Odagiri et al. |
| 6,212,133 B1 | 4/2001 | McCoy et al. |
| 6,226,622 B1 | 5/2001 | Dabbiere |
| 6,231,519 B1 | 5/2001 | Blants et al. |
| 6,232,916 B1 | 5/2001 | Grillo et al. |
| 6,236,358 B1 | 5/2001 | Durst et al. |
| 6,238,337 B1 | 5/2001 | Kambhatla et al. |
| 6,243,039 B1 | 6/2001 | Elliot |
| 6,243,660 B1 | 6/2001 | Hsu et al. |
| 6,246,376 B1 | 6/2001 | Bork et al. |
| 6,252,543 B1 | 6/2001 | Camp |
| 6,252,544 B1 | 6/2001 | Hoffberg |
| 6,259,944 B1 | 7/2001 | Margulis et al. |
| 6,263,280 B1 | 7/2001 | Stingone, Jr. |
| 6,266,612 B1 | 7/2001 | Dussell et al. |
| 6,272,457 B1 | 8/2001 | Ford et al. |
| 6,278,936 B1 | 8/2001 | Jones |
| 6,281,797 B1 | 8/2001 | Forster et al. |
| 6,282,362 B1 | 8/2001 | Murphy et al. |
| 6,282,495 B1 | 8/2001 | Kirkhart et al. |
| 6,285,314 B1 | 9/2001 | Nagatsuma et al. |
| 6,292,687 B1 | 9/2001 | Lowell et al. |
| 6,298,306 B1 | 10/2001 | Suarez et al. |
| 6,300,875 B1 | 10/2001 | Schafer |
| 6,302,844 B1 | 10/2001 | Walker et al. |
| 6,304,467 B1 | 10/2001 | Nebrigic |
| 6,314,308 B1 | 11/2001 | Sheynblat et al. |
| 6,315,719 B1 | 11/2001 | Rode et al. |
| 6,317,049 B1 | 11/2001 | Toubia et al. |
| 6,321,091 B1 | 11/2001 | Holland |
| 6,321,158 B1 | 11/2001 | DeLorme et al. |
| 6,323,807 B1 | 11/2001 | Golding et al. |
| 6,324,213 B1 | 11/2001 | Harrison |
| 6,327,533 B1 | 12/2001 | Chou |
| 6,330,149 B1 | 12/2001 | Burrell |
| 6,331,817 B1 | 12/2001 | Goldberg |
| 6,331,825 B1 | 12/2001 | Ladner et al. |
| 6,339,397 B1 | 1/2002 | Baker |
| 6,340,928 B1 | 1/2002 | McCurdy |
| 6,342,847 B1 | 1/2002 | Archuleta et al. |
| 6,349,257 B1 | 2/2002 | Liu et al. |
| 6,353,390 B1 | 3/2002 | Beri et al. |
| 6,353,798 B1 | 3/2002 | Green et al. |
| 6,356,836 B1 | 3/2002 | Adolph |
| 6,356,841 B1 | 3/2002 | Hamrick et al. |
| 6,362,778 B2 | 3/2002 | Neher |
| 6,363,254 B1 | 3/2002 | Jones et al. |
| 6,363,323 B1 | 3/2002 | Jones |
| 6,366,871 B1 | 4/2002 | Geva |
| 6,373,430 B1 | 4/2002 | Beason et al. |
| 6,377,810 B1 | 4/2002 | Geiger et al. |
| 6,384,724 B1 | 5/2002 | Landais |
| 6,388,612 B1 | 5/2002 | Neher |
| 6,393,346 B1 | 5/2002 | Keith et al. |
| 6,404,352 B1 | 6/2002 | Ichikawa et al. |
| 6,407,698 B1 | 6/2002 | Ayed |
| 6,411,892 B1 | 6/2002 | Van Diggelen |
| 6,411,899 B2 | 6/2002 | Dussell et al. |
| 6,421,538 B1 | 7/2002 | Byrne |
| 6,426,719 B1 | 7/2002 | Nagareda et al. |
| 6,427,120 B1 | 7/2002 | Garin et al. |
| 6,430,602 B1 | 8/2002 | Kay et al. |
| 6,433,732 B1 | 8/2002 | Dutta et al. |
| 6,434,396 B1 | 8/2002 | Rune |
| 6,437,692 B1 | 8/2002 | Petite et al. |
| 6,441,778 B1 | 8/2002 | Durst et al. |
| 6,442,380 B1 | 8/2002 | Mohindra |
| 6,442,391 B1 | 8/2002 | Johansson et al. |
| 6,443,890 B1 | 9/2002 | Schulze et al. |
| 6,445,937 B1 | 9/2002 | daSilva |
| 6,453,237 B1 | 9/2002 | Fuchs et al. |
| 6,463,272 B1 | 10/2002 | Wallace et al. |
| 6,466,821 B1 | 10/2002 | Pianca et al. |
| 6,469,639 B2 | 10/2002 | Tanenhaus et al. |
| 6,471,087 B1 | 10/2002 | Shusterman |
| 6,478,736 B1 | 11/2002 | Mault |
| 6,484,034 B1 | 11/2002 | Tsunehara et al. |
| 6,496,775 B2 | 12/2002 | McDonald, Jr. et al. |
| 6,501,429 B2 | 12/2002 | Nakamura et al. |
| 6,505,048 B1 | 1/2003 | Moles et al. |
| 6,505,049 B1 | 1/2003 | Dorenbosch |
| 6,512,456 B1 | 1/2003 | Taylor, Jr. |
| 6,513,532 B2 | 2/2003 | Mault et al. |
| 6,522,871 B1 | 2/2003 | Patrick et al. |
| 6,522,889 B1 | 2/2003 | Aarnio |
| 6,529,164 B1 | 3/2003 | Carter |
| 6,529,822 B1 | 3/2003 | Millington et al. |
| 6,544,193 B2 | 4/2003 | Abreu |
| 6,552,652 B2 | 4/2003 | Beken |
| 6,553,336 B1 | 4/2003 | Johnson et al. |
| 6,559,620 B2 | 5/2003 | Zhou et al. |
| 6,560,463 B1 | 5/2003 | Santhoff |
| 6,569,094 B2 | 5/2003 | Suzuki et al. |
| 6,571,193 B1 | 5/2003 | Unuma et al. |
| 6,579,231 B1 | 6/2003 | Phipps |
| 6,579,844 B1 | 6/2003 | Morrison et al. |
| 6,611,688 B1 | 8/2003 | Raith |
| 6,616,593 B1 | 9/2003 | Elliott et al. |
| 6,625,437 B1 | 9/2003 | Jampolsky et al. |
| 6,630,885 B2 | 10/2003 | Hardman et al. |
| 6,640,085 B1 | 10/2003 | Chatzipetros et al. |
| 6,650,907 B1 | 11/2003 | Kamperschroer et al. |
| 6,661,372 B1 | 12/2003 | Girerd et al. |
| 6,679,071 B1 | 1/2004 | Storey et al. |
| 6,696,982 B2 | 2/2004 | Yoshioka et al. |
| 6,697,103 B1 | 2/2004 | Fernandez et al. |
| 6,697,730 B2 | 2/2004 | Dickerson |
| 6,714,158 B1 | 3/2004 | Underbrink et al. |
| 6,714,791 B2 | 3/2004 | Friedman |
| 6,721,542 B1 | 4/2004 | Anttila et al. |
| 6,741,927 B2 | 5/2004 | Jones |
| 6,747,675 B1 | 6/2004 | Abbott et al. |
| 6,748,318 B1 | 6/2004 | Jones |
| 6,788,766 B2 | 9/2004 | Logan |

(56) References Cited

U.S. PATENT DOCUMENTS

| | | |
|---|---|---|
| 6,801,853 B2 | 10/2004 | Workman |
| 6,804,606 B2 | 10/2004 | Jones |
| 6,825,767 B2 | 11/2004 | Humbard |
| 6,832,093 B1 | 12/2004 | Ranta |
| 6,847,892 B2 | 1/2005 | Zhou et al. |
| 6,856,804 B1 | 2/2005 | Ciotta |
| 6,856,807 B1 | 2/2005 | Raith |
| 6,865,385 B1 | 3/2005 | Kohda et al. |
| 6,876,862 B1 | 4/2005 | Tanaka |
| 6,888,879 B1 | 5/2005 | Lennen |
| 6,937,900 B1 | 8/2005 | Pianca et al. |
| 6,952,645 B1 | 10/2005 | Jones |
| 6,975,941 B1 | 12/2005 | Lau et al. |
| 6,980,813 B2 | 12/2005 | Mohi et al. |
| 6,980,826 B2 | 12/2005 | Yamaguchi |
| 6,997,882 B1 | 2/2006 | Parker et al. |
| 7,010,144 B1 | 3/2006 | Davis et al. |
| 7,071,842 B1 | 7/2006 | Brady, Jr. |
| 7,085,253 B2 | 8/2006 | Yang |
| 7,110,773 B1 | 9/2006 | Wallace et al. |
| 7,136,832 B2 | 11/2006 | Li et al. |
| 7,187,278 B2 | 3/2007 | Biffar |
| 7,212,829 B1 | 5/2007 | Lau et al. |
| 7,218,938 B1 | 5/2007 | Lau et al. |
| 7,253,731 B2 | 8/2007 | Joao |
| 7,308,272 B1 | 12/2007 | Wortham |
| 7,321,774 B1 | 1/2008 | Lau et al. |
| 7,325,061 B2 | 1/2008 | Haruki |
| 7,366,522 B2 | 4/2008 | Thomas |
| 7,375,682 B1 | 5/2008 | Tester et al. |
| 7,403,972 B1 | 7/2008 | Lau et al. |
| 7,482,920 B2 | 1/2009 | Joao |
| 7,539,557 B2 | 5/2009 | Yamauchi |
| 7,809,377 B1 | 10/2010 | Lau et al. |
| 7,905,832 B1 | 3/2011 | Lau et al. |
| 7,953,809 B2 | 5/2011 | Lau et al. |
| 8,176,135 B2 | 5/2012 | Lau et al. |
| 8,285,484 B1 | 10/2012 | Lau et al. |
| 8,301,158 B1 | 10/2012 | Thomas |
| 8,447,822 B2 | 5/2013 | Lau et al. |
| 8,611,920 B2 | 12/2013 | Lau et al. |
| 8,620,343 B1 | 12/2013 | Lau et al. |
| 8,700,050 B1 | 4/2014 | Thomas |
| 8,725,165 B2 | 5/2014 | Lau et al. |
| 8,753,273 B1 | 6/2014 | Lau et al. |
| 8,868,103 B2 | 10/2014 | Thomas |
| 8,886,220 B2 | 11/2014 | Lau et al. |
| 8,975,941 B2 | 3/2015 | Zierhofer |
| 9,049,571 B2 | 6/2015 | Lau et al. |
| 9,074,903 B1 | 7/2015 | Lau et al. |
| 9,182,238 B2 | 11/2015 | Lau et al. |
| 9,219,988 B2 | 12/2015 | Lau et al. |
| 9,456,350 B2 | 9/2016 | Lau et al. |
| 9,596,579 B2 | 3/2017 | Lau et al. |
| 9,706,374 B2 | 7/2017 | Lau et al. |
| 9,723,442 B2 | 8/2017 | Lau et al. |
| 9,759,817 B2 | 9/2017 | Lau et al. |
| 9,769,630 B2 | 9/2017 | Lau et al. |
| 9,930,503 B2 | 3/2018 | Lau et al. |
| 9,998,886 B2 | 6/2018 | Lau et al. |
| 10,034,150 B2 | 7/2018 | Lau et al. |
| 10,327,115 B2 | 6/2019 | Lau et al. |
| 10,356,568 B2 | 7/2019 | Lau et al. |
| 10,516,975 B2 | 12/2019 | Lau et al. |
| 2001/0006891 A1 | 7/2001 | Cho |
| 2001/0020204 A1 | 9/2001 | Runyon et al. |
| 2001/0027378 A1 | 10/2001 | Tennison et al. |
| 2001/0027384 A1 | 10/2001 | Schulze et al. |
| 2001/0027525 A1 | 10/2001 | Gamlin |
| 2001/0028304 A1 | 10/2001 | l'Anson et al. |
| 2001/0041554 A1 | 11/2001 | Rowell |
| 2001/0044299 A1 | 11/2001 | Sandegren |
| 2001/0044332 A1 | 11/2001 | Yamada et al. |
| 2001/0047125 A1 | 11/2001 | Quy |
| 2001/0052849 A1 | 12/2001 | Jones, Jr. |
| 2002/0000916 A1 | 1/2002 | Richards |
| 2002/0000930 A1 | 1/2002 | Crowson et al. |
| 2002/0008661 A1 | 1/2002 | McCall et al. |
| 2002/0015439 A1 | 2/2002 | Kohli et al. |
| 2002/0016173 A1 | 2/2002 | Hunzinger |
| 2002/0027507 A1 | 3/2002 | Yarin et al. |
| 2002/0028988 A1 | 3/2002 | Suzuki et al. |
| 2002/0036593 A1 | 3/2002 | Ying |
| 2002/0038182 A1 | 3/2002 | Wong et al. |
| 2002/0049742 A1 | 4/2002 | Chan et al. |
| 2002/0050945 A1 | 5/2002 | Tsukishima et al. |
| 2002/0055362 A1 | 5/2002 | Aoyama |
| 2002/0057192 A1 | 5/2002 | Eagleson et al. |
| 2002/0063622 A1 | 5/2002 | Armstrong et al. |
| 2002/0071677 A1 | 6/2002 | Sumanaweera |
| 2002/0077080 A1 | 6/2002 | Greene |
| 2002/0087260 A1 | 7/2002 | Hancock et al. |
| 2002/0087619 A1 | 7/2002 | Tripathi |
| 2002/0094067 A1 | 7/2002 | August |
| 2002/0099567 A1 | 7/2002 | Joao |
| 2002/0111171 A1 | 8/2002 | Boesch et al. |
| 2002/0111819 A1 | 8/2002 | Li et al. |
| 2002/0115450 A1 | 8/2002 | Muramatsu |
| 2002/0115453 A1 | 8/2002 | Poulin et al. |
| 2002/0116080 A1 | 8/2002 | Birnbach et al. |
| 2002/0119770 A1 | 8/2002 | Twitchell et al. |
| 2002/0119789 A1 | 8/2002 | Friedman |
| 2002/0120475 A1 | 8/2002 | Morimoto |
| 2002/0120503 A1 | 8/2002 | Iwayama et al. |
| 2002/0138196 A1 | 9/2002 | Polidi et al. |
| 2002/0140081 A1 | 10/2002 | Chou et al. |
| 2002/0173910 A1 | 11/2002 | McCall et al. |
| 2002/0191757 A1 | 12/2002 | Belrose |
| 2002/0193121 A1 | 12/2002 | Nowak et al. |
| 2002/0193996 A1 | 12/2002 | Squibbs et al. |
| 2002/0198003 A1 | 12/2002 | Klapman |
| 2002/0198055 A1 | 12/2002 | Bull et al. |
| 2003/0003943 A1 | 1/2003 | Bajikar |
| 2003/0009410 A1 | 1/2003 | Ramankutty et al. |
| 2003/0013445 A1 | 1/2003 | Fujiwara et al. |
| 2003/0018430 A1 | 1/2003 | Ladetto et al. |
| 2003/0036389 A1 | 2/2003 | Yen |
| 2003/0036683 A1 | 2/2003 | Kehr et al. |
| 2003/0054827 A1 | 3/2003 | Schmidl et al. |
| 2003/0068605 A1 | 4/2003 | Kullok et al. |
| 2003/0069759 A1 | 4/2003 | Smith |
| 2003/0083011 A1 | 5/2003 | Haller et al. |
| 2003/0083046 A1 | 5/2003 | Mathis |
| 2003/0083814 A1 | 5/2003 | Gronemeyer |
| 2003/0095540 A1 | 5/2003 | Mulligan et al. |
| 2003/0100326 A1 | 5/2003 | Grube et al. |
| 2003/0107514 A1 | 6/2003 | Syrjarinne et al. |
| 2003/0114206 A1 | 6/2003 | Timothy et al. |
| 2003/0151507 A1 | 8/2003 | Andre et al. |
| 2003/0163287 A1 | 8/2003 | Vock et al. |
| 2003/0182052 A1 | 9/2003 | DeLorme et al. |
| 2003/0204132 A1 | 10/2003 | Suzuki et al. |
| 2004/0034470 A1 | 2/2004 | Workman |
| 2004/0046637 A1 | 3/2004 | Wesby Van Swaay |
| 2004/0114731 A1 | 6/2004 | Gillett et al. |
| 2004/0117108 A1 | 6/2004 | Nemeth |
| 2004/0192352 A1 | 9/2004 | Vallstrom et al. |
| 2004/0204820 A1 | 10/2004 | Diaz |
| 2004/0233065 A1 | 11/2004 | Freeman |
| 2005/0250440 A1 | 11/2005 | Zhou et al. |
| 2006/0139375 A1 | 6/2006 | Rasmussen et al. |
| 2006/0173444 A1 | 8/2006 | Choy et al. |
| 2007/0156286 A1 | 7/2007 | Yamauchi |
| 2008/0021645 A1 | 1/2008 | Lau et al. |
| 2008/0261636 A1 | 10/2008 | Lau et al. |
| 2009/0042540 A1 | 2/2009 | Bodnar et al. |
| 2011/0022533 A1 | 1/2011 | Lau et al. |
| 2011/0223884 A1 | 9/2011 | Lau et al. |
| 2012/0220266 A1 | 8/2012 | Lau et al. |
| 2013/0203388 A1 | 8/2013 | Thomas et al. |
| 2013/0297524 A1 | 11/2013 | Lau et al. |
| 2014/0011524 A1 | 1/2014 | Lau et al. |
| 2014/0067708 A1 | 3/2014 | Lau et al. |
| 2014/0273953 A1 | 9/2014 | Lau et al. |

(56) References Cited

U.S. PATENT DOCUMENTS

| | | |
|---|---|---|
| 2014/0278084 A1 | 9/2014 | Lau et al. |
| 2014/0296659 A1 | 10/2014 | Lau et al. |
| 2015/0011243 A1 | 1/2015 | Thomas et al. |
| 2015/0038168 A1 | 2/2015 | Thomas et al. |
| 2015/0264576 A1 | 9/2015 | Lau et al. |
| 2016/0025863 A1 | 1/2016 | Lau et al. |
| 2016/0029175 A1 | 1/2016 | Lau et al. |
| 2016/0050533 A1 | 2/2016 | Lau et al. |
| 2017/0013426 A1 | 1/2017 | Lau et al. |
| 2017/0094458 A1 | 3/2017 | Thomas et al. |
| 2017/0111776 A1 | 4/2017 | Lau et al. |
| 2017/0111777 A1 | 4/2017 | Lau et al. |
| 2017/0188208 A1 | 6/2017 | Lau et al. |
| 2017/0353841 A1 | 12/2017 | Lau et al. |
| 2018/0011201 A1 | 1/2018 | Lau et al. |
| 2018/0027394 A1 | 1/2018 | Lau et al. |
| 2018/0211216 A1 | 7/2018 | Lau et al. |
| 2018/0213372 A1 | 7/2018 | Lau et al. |
| 2018/0255439 A1 | 9/2018 | Lau et al. |
| 2018/0302759 A1 | 10/2018 | Lau et al. |
| 2019/0215643 A1 | 7/2019 | Lau et al. |

FOREIGN PATENT DOCUMENTS

| | | |
|---|---|---|
| EP | 1 037 447 A3 | 10/2001 |
| JP | 09251069 A | 9/1997 |
| JP | 11-64482 | 3/1999 |
| JP | 11-258325 | 9/1999 |
| JP | 11-289574 | 10/1999 |
| JP | 11-306491 | 11/1999 |
| JP | 2001344678 A | 12/2001 |
| WO | WO 97/14054 | 4/1997 |
| WO | WO 97/41654 A1 | 11/1997 |
| WO | WO 98/01769 A1 | 1/1998 |
| WO | WO 98/16045 A1 | 4/1998 |
| WO | WO 98/40837 | 9/1998 |
| WO | WO 00/51391 | 8/2000 |
| WO | WO 01/50151 A1 | 7/2001 |
| WO | WO 01/63318 A1 | 8/2001 |
| WO | WO 01/75700 A2 | 10/2001 |
| WO | WO 02/42979 A1 | 5/2002 |
| WO | WO 02/084618 A1 | 10/2002 |
| WO | WO 03/012720 A1 | 2/2003 |

OTHER PUBLICATIONS

PCVtrak™ Installation and Operator's Manual, Trimble Navigation, 24623-00 Rev. A, May 1994, pp. 1-259.
"Advanced Traveler Aid Systems for Public Transportation," Final Report, Federal Transit Administration, Sep. 1994, pp. 1-131.
Campbell, Laurel, "Security—Military satellite enlisted to thwart car crime," The Commercial Appeal, Sep. 26, 1996, pp. 5B.
Law, Alex, "Week in Wheels/ . . . From a Driver's Notebook," Newsday, Inc., Sep. 20, 1996, pp. C03.
Cortez, Angela, "Springs police can track thief, vehicles," The Denver Post, Sep. 10, 1996, pp. B-01.
"OnGuard Tracker Nabs Auto Burglar," Global Positioning & Navigation News, vol. 6, No. 16, Aug. 8, 1996.
"OnGuard Tracker Nabs Auto Burglar," Section: Financial News, PR Newswire, Jul. 29, 1996.
Nauman, Matt, "Pressing the Panic Button: Car Security Enters a New Age with Cellular Phones and Satellites that Watch Over You," San Jose Mercury News, Jun. 21, 1996, pp. 1G.
"Monday Briefing" San Antonio Express-News, p. 1, Part B, Jun. 10, 1996.
"OnGuard Tracker Makes Debut on 'One Lap of America'," PR Newswire, Jun. 7, 1996.
"OnGuard Tracker Makes Debut on 'One Lap of America'," Southwest Newswire, Jun. 7, 1996.
Dominguez, Raul, "Women get their day in sun—American Golf planning events nationwide May 18," San Antonio Express-News, Apr. 18, 1996, pp. 2, part B.

"Vehicle Navigation Units Being Measured in Luxury Autos," Global Positioning & Navigation News, vol. 6, No. 7, Apr. 4, 1996.
"Advanced Business Sciences, Inc. Announces Completion of Acquisition of Comguard of Illinois," Business Wire, Aug. 26, 1998.
"Advanced Business Sciences, Inc. Announces Filing With Securities and Exchange Commission," Business Wire, Jun. 25, 1999.
"Advanced Business Sciences, Inc. Announces Preliminary Fourth Quarter 1998 Revenue Results," Business Wire, Feb. 4, 1999.
"Business People Burnsy's Grill Names Two," Omaha World-Herald, Section Business, p. 4M, Oct. 20, 1996.
"Company Sees Prisoner Tracking and Monitoring Market Niche," Global Positioning & Navigation News, vol. 6, No. 10, May 16, 1996.
GPS-Based Personal Monitoring Systems Offered to Corrections, Private Market, Global Positioning & Navigation News, vol. 8, No. 11, Jun. 3, 1998.
GPS tracks parolees, probationers, Corrections Professional, vol. 5, No. 6, Nov. 19, 1999.
High-Tech System Tracks Offenders—Satellites Watching Criminals, Business Wire, Nov. 14, 1997.
Briefs, Global Positioning & Navigation News, vol. 9, No. 4, Feb. 24, 1999.
Dunkelberger, Lloyd, "Lawmakers question criminal-tracking system," Sarasota Herald-Tribune (Florida), pp. 16A, Nov. 28, 1999.
Powell, Barbara. "New gadgets help drivers find their way," Fort Worth Star-Telegram (Texas), p. 1, Jan. 20, 1997.
"New Service Lets Corrections Agencies Track Offenders by Satellite," PR Newswire, Jan. 11, 1999.
"New Service Lets Corrections Agencies Track Offenders by Satellite; SecurityLink Offers "GPS" Tracking for Offenders on Electronic Monitoring—Sandusky Municipal Court Adopts Technology for Local Offenders," PR Newswire, Jan. 12, 1999.
"New Service Lets Corrections Agencies Track Offenders by Satellite; SecurityLink Offers "GPS" Tracking for Offenders on Electronic Monitoring," PR Newswire, Section: Financial News, Jan. 11, 1999.
"New Service Lets Corrections Agencies Track Offenders by Satellite," Satellite Today, vol. 2, No. 8, Jan. 13, 1999.
"Prisoner Security Monitoring Company Grabs Contracts for GPS-Based System," Global Positioning & Navigation News, vol. 7, No. 1, Jan. 15, 1997.
Atwater, Andi, "Proposal seeking 24-hour tracking of all sex offenders," The News-Press (Fort Meyers, FL), pp. 1A, Feb. 20, 2000.
Briefs, Global Positioning & Navigation News, vol. 9, No. 3, Feb. 10, 1999.
Brauer, David, "Satellite 'Big Brother' Tracks Ex-Inmates; Agencies Experiment with GPS to Monitor Parolee Whereabouts," Chicago Tribune, Section: News, p. 31, Dec. 18, 1998.
"Satellite Spotlight; Eye in the Sky to Monitor Parolees," Satellite News, vol. 21, No. 15, Apr. 13, 1998.
"Satellite Spotlight: Fighting Crime From Space," Satellite News, vol. 19, No. 20, May 13, 1996.
Prohaska, Thomas J, "Satellite Will Keep Tabs on Convicts," Buffalo News (New York), Section: Local, p. 5B, Sep. 20, 1999.
"Sierra Wireless and Pro Tech Team Up on Monitoring Product," Global Positioning & Navigation News, vol. 8, No. 8, Apr. 22, 1998.
Anderson, Larry, "Technology rules at Securing New Ground," Access Control & Security Systems Integration, Section: Industry Outlook; ISSN 1084-6425, Dec. 1999.
Trimble Navigation Warns 2nd-Quarter Earnings to Miss Target, Dow Jones Business News, Jul. 10, 1998.
"Trimble Navigation's Net Income Skidded 93% Amid Order Delays," Dow Jones Business News, Jul. 23, 1998.
Briefs, Global Positioning & Navigation News, vol. 9, No. 2, Jan. 27, 1999.
Briefs, Global Positioning & Navigation News, vol. 9, No. 14, Jul. 14, 1999.
Dailey et al. "Automatic Transit Location System," Final Research Report, 55 pgs., Feb. 1996.
Maguire, Jr. et al. "SmartBadges: a wearable computer and communication system," codes/CASHE '98, 47 pgs., 1998.

(56) References Cited

OTHER PUBLICATIONS

Koshima et al. "Personal locator services emerge," IEEE Spectrum, Feb. 2000, pp. 41-48.
Zygowicz et al. "State of the Art in Automatic Vehicle Location Systems," Center for Urban Transportation Studies, University of Wisconsin, Milwaukee, Feb. 1998.
Ashworth, Jon. "Big brother is watching you," The Times (London), Section: Features, May 7, 1999.
"Car Thieves Take the "Bait" in Michigan; Two Suspects Reeled in With OnGuard," Business Wire, Sep. 11, 1997.
Sauer, Matthew, "Company Finds Niche by Giving Directions . . . " Sarasota Herald-Tribune (Florida), Section: Business Weekly, p. 1, Jul. 7, 1997.
"ATX Technologies Signs Nationwide Service Deal with AT&T," Global Positioning & Navigation News, vol. 7, No. 9, May 7, 1997.
"Car Thieves Take the 'Bait' in Tulsa; Two Suspects Caught Off Guard with OnGuard Once Again," PR Newswire, Section: Financial News, Jan. 8, 1997.
"Car Thieves Take the 'Bait' in Tulsa; Two Suspects Caught Off Guard with on Guard," PR Newswire, Section: Financial News, Dec. 9, 1996.
Jackson, Terry, "Smart Cars Whether by Satellite or the Internet, High-Tech Devices and Services May Make Crumpled Road Maps a Thing of the Past," The Miami Herald, Section: Travel, p. 1J, Oct. 6, 1996.
"San Antonio Personal Security Company Links Up with Senior PGA Golfer," PR Newswire, Section: Financial News, Apr. 1, 1996.
"San Antonio Personal Security Company Links Up with Senior PGA Golfer," Southwest Newswire, Apr. 1, 1996.
Business Briefs, San Antonio Express-News, Mar. 25, 1996.
"ATX Research Signs Exclusive Sales Agreement with Arizona Company," PR Newswire, Mar. 21, 1996.
"ATX Research Signs Exclusive Sales Agreement with Arizona Company, "Southwest Newswire, Mar. 21, 1996.
"Automotive GPS Satellite/Safety System Race Is on," Southwest Newswire, Feb. 20, 1996.
"Dealerships Can Track Down New Aftermarket Revenues," PR Newswire, Feb. 9, 1996.
"ATX Research Unveils New Stealthtrac Capability," PR Newswire, Feb. 9, 1996.
"Dealerships Can Track Down New Aftermarket Revenues," Southwest Newswire, Feb. 9, 1996.
Briefs, Global Positioning & Navigation News Wire, vol. 6, No. 2, Jan. 24, 1996.
"ATX Research Provides Police Departments With Onguard Personal Security and Vehicle Tracking System," PR Newswire, Jan. 15, 1996.
"ATX Research Provides Police Departments With Onguard Personal Security and Vehicle Tracking System," Southwest Newswire, Jan. 15, 1996.
"ATX Research Relocates to New Corporate Headquarters," PR Newswire, Dec. 12, 1995.
"ATX Research Relocates to New Corporate Headquarters," Southwest Newswire, Dec. 12, 1995.
"Texas invention tracks stolen cars, lets driver call for help," The Vancouver Sun, Oct. 20, 1995.
"San Antonio Company Unveils Satellite/Cellular Personal Security System," PR Newswire, Oct. 3, 1995.
"San Antonio Company Unveils Satellite/Cellular Personal Security System," Southwest Newswire, Oct. 3, 1995.
Office Action for U.S. Appl. No. 14/923,882, dated Jul. 3, 2017.
Office Action for U.S. Appl. No. 14/923,882, dated Sep. 26, 2017.
Office Action for U.S. Appl. No. 14/923,882, dated Nov. 28, 2017.
Notice of Allowance for U.S. Appl. No. 14/923,882, dated Mar. 22, 2018.
Notice of Allowance for U.S. Appl. No. 13/802,641, dated Jan. 17, 2018.
Notice of Allowance for U.S. Appl. No. 13/802,641, dated Aug. 16, 2017.
Office Action for U.S. Appl. No. 10/397,472 dated Sep. 29, 2006.
Notice of Allowance for U.S. Appl. No. 10/397,472, dated Dec. 6, 2006.
Notice of Allowance for U.S. Appl. No. 10/397,472, dated Feb. 28, 2007.
Notice of Allowance for U.S. Appl. No. 11/705,339, dated Jun. 22, 2012.
Notice of Allowance for U.S. Appl. No. 11/705,339, dated Sep. 7, 2011.
Notice of Allowance for U.S. Appl. No. 11/705,339, dated Apr. 15, 2011.
Notice of Allowance for U.S. Appl. No. 11/705,339, dated Jan. 26, 2011.
Office Action for U.S. Appl. No. 11/705,339, dated Oct. 25, 2010.
Office Action for U.S. Appl. No. 11/705,339, dated Jul. 1, 2010.
Office Action for U.S. Appl. No. 11/705,339, dated Nov. 17, 2009.
Office Action for U.S. Appl. No. 11/705,339, dated Jul. 30, 2009.
Notice of Allowance for U.S. Appl. No. 11/705,339, dated Mar. 29, 2013.
Notice of Allowance for U.S. Appl. No. 11/705,339, dated Aug. 30, 2013.
Office Action for U.S. Appl. No. 13/933,770, dated Nov. 14, 2013.
Notice of Allowance for U.S. Appl. No. 13/933,770, dated Mar. 7, 2014.
Notice of Allowance for U.S. Appl. No. 13/933,770, dated Jun. 10, 2014.
Notice of Allowance for U.S. Appl. No. 13/933,770, dated Sep. 19, 2014.
Office Action for U.S. Appl. No. 14/519,503, dated Apr. 3, 2015.
Notice of Allowance for U.S. Appl. No. 14/519,503, dated Jun. 17, 2015.
Notice of Allowance for U.S. Appl. No. 14/519,503, dated Aug. 26, 2015.
Non-Final Office Action for U.S. Appl. No. 14/874,782, dated Jan. 21, 2016.
Notice of Allowance for U.S. Appl. No. 14/874,782, dated Apr. 8, 2016.
Notice of Allowance for U.S. Appl. No. 14/874,782, dated Jul. 8, 2016.
Notice of Allowance for U.S. Appl. No. 14/874,782, dated Nov. 14, 2016.
Notice of Allowance for U.S. Appl. No. 14/874,872, dated Mar. 29, 2017.
Notice of Allowance for U.S. Appl. No. 14/874,872, dated May 11, 2017.
Office Action for U.S. Appl. No. 14/923,882, dated Feb. 5, 2016.
Office Action for U.S. Appl. No. 14/923,882, dated Jul. 7, 2016.
Office Action for U.S. Appl. No. 14/923,882, dated Sep. 22, 2016.
Office Action for U.S. Appl. No. 14/923,882, dated Mar. 10, 2017.
Office Action for U.S. Appl. No. 14/923,882, dated May 17, 2017.
Office Action for U.S. Appl. No. 10/397,637, dated Sep. 29, 2006.
Notice of Allowance for U.S. Appl. No. 10/397,637, dated Jan. 22, 2007.
Office Action for U.S. Appl. No. 11/732,581, dated Jan. 20, 2010.
Notice of Allowance for U.S. Appl. No. 11/732,581, dated Jun. 16, 2010.
Non-Final Office Action for U.S. Appl. No. 12/924,470, dated May 4, 2012.
Notice of Allowance for U.S. Appl. No. 12/924,470, dated Nov. 23, 2012.
Notice of Allowance for U.S. Appl. No. 12/924,470, dated Mar. 20, 2013.
Notice of Allowance for U.S. Appl. No. 12/924,470, dated Aug. 29, 2013.
Notice of Allowance for U.S. Appl. No. 12/924,470, dated Dec. 19, 2013.
Notice of Allowance for U.S. Appl. No. 13/802,641, dated Apr. 27, 2017.
Notice of Allowance for U.S. Appl. No. 13/802,641, dated Jan. 13, 2017.
Notice of Allowance for U.S. Appl. No. 13/802,641, dated Sep. 29, 2016.
Notice of Allowance for U.S. Appl. No. 13/802,641, dated Jun. 16, 2016.

(56) References Cited

OTHER PUBLICATIONS

Notice of Allowance for U.S. Appl. No. 13/802,641, dated Mar. 3, 2016.
Notice of Allowance for U.S. Appl. No. 13/802,641, dated Nov. 9, 2015.
Notice of Allowance for U.S. Appl. No. 13/802,641, dated Jul. 8, 2015.
Notice of Allowance for U.S. Appl. No. 13/802,641, dated Jan. 21, 2015.
Notice of Allowance for U.S. Appl. No. 13/802,641, dated Aug. 18, 2014.
Office Action for U.S. Appl. No. 13/802,641, dated Mar. 27, 2014.
U.S. Appl. No. 13/802,641, filed Mar. 13, 2013.
U.S. Appl. No. 13/802,624, filed Mar. 13, 2013.
Office Action for U.S. Appl. No. 13/802,624, dated Nov. 18, 2014.
Office Action for U.S. Appl. No. 13/802,624, dated May 26, 2015.
Office Action for U.S. Appl. No. 10/397,640, dated Oct. 24, 2006.
Notice of Allowance for U.S. Appl. No. 10/397,640, dated Nov. 13, 2007.
Notice of Allowance for U.S. Appl. No. 10/397,640, dated Mar. 23, 2007.
Office Action for U.S. Appl. No. 11/800,126, dated Sep. 29, 2011.
Office Action for U.S. Appl. No. 11/800,126, dated Jul. 21, 2010.
Office Action for U.S. Appl. No. 11/800,126, dated Mar. 18, 2010.
Restriction Requirement for U.S. Appl. No. 11/800,126, dated Dec. 10, 2009.
Office Action for U.S. Appl. No. 11/800,126, dated Oct. 15, 2012.
Office Action for U.S. Appl. No. 11/800,126, dated May 7, 2013.
Notice of Allowance for U.S. Appl. No. 11/800,126, dated Aug. 29, 2013.
Notice of Allowance for U.S. Appl. No. 11/800,126, dated Nov. 20, 2013.
"352022 Miniature Low Profile ICP Accelerometer," Precision Accelerometers, PCB Piezoelectronics Products—SVS Division, webpages, pp. 1-2 (downloaded Apr. 11, 2002: www.pcb.com/products/sys/sys352c22.html).
"3G Mobile Internet Revolution, . . . only with Location Based Services!" pp. 1, (downloaded Aug. 10, 2002: http://webhome.idirect.com/~dental/3glocator/home.htm).
"Airline Cargo Containers," Case Study, RJI Incorporated, webpages, pp. 1-2 (downloaded Mar. 16, 2002: www.rji.cc/casestudies/airlinecargocontainers.html).
"Airline Food Carts," Case Study, RJI Incorporated, webpages, pp. 1-2 (downloaded Mar. 16, 2002: www.rji.cc/casestudies/airlinefoodcarts.html).
"An Introduction to SnapTrack Server-Aided GPS Technology," SnapTrack Inc., Apr. 3, 2007.
Archived page entitled "Money-Back Guarantee Policy" from fedex.com, archived by the Internet Archive on Aug. 17, 2000.
"Audiovox Intros GPS, Bluetooth Phone;" INT Media Group, Inc. (allNetDevices), Apr. 5, 2002. (downloaded: www.allnetdevices.com/wireless/news/2001/1/15/audiovox_intros.html).
"Carrier and end-user applications for wireless location systems," TruePosition, Inc., http://www.trueposition.com/spie_app.htm, downloaded, Jul. 30, 2000, pp. 1-7.
Capozza, P.T., et al. "A single-chip narrow-band frequency domain excisor for a Global Positioning System (GPS) receiver," IEEE Journal of Solid-State Circuits, vol. 35, Issue 3, Mar. 2000, pp. 401-411.
"Danger—Products" and "Hiptop Communicator Brochure," Danger, Inc., downloaded Oct. 26, 2002: www.danger.com/products.php).
"Developing a GPSs for the Global Supply Chain," Aberdeen Group, Inc., Executive White Paper, Jun. 2002.
"Devices for Text Messages in Deutsche Telekom's fixed network have already found their way into many households," Deutsche Telekom AG, Press Release, Mar. 13, 2002, pp. 1-2.
"Digital/Analog Compass Sensors" and "1655 Digital Compass Sensor," webpages, The Robson Company, Inc., pp. 1-2 (downloaded Apr. 11, 2002: www.dinsmoresensors.com/index.html).

"EarthTrack™ Vehicle Tracking Systems," Outfitter Satellite, Inc., 1998 (downloaded Jan. 22, 2000).
"Enhanced Tracking," United Parcel Service of America, Inc. (UPS), webpages, pp. 1-2 (downloaded Jun. 1, 2002: www.ups.com/myupsinfo/info/etrack?pnav=stdservice).
"Fleet Management Systems-Asset Tracking Devices," Axiom Navigation Inc., 2000-2001 (downloaded Oct. 19, 2002: www.axiomnav.com/Prod_Systems/prod_system.asp).
"Frozen Food Warehouse," Case Study, RJI Incorporated, webpages, pp. 1-3 (downloaded Mar. 16, 2002: www.rji.cc/casestudies/frozenfoodwarehouse.html).
"FunMail Launches on the NTT DoCoMo i-mode network," FunMail, Press Release, May 1, 2001, pp. 1-2.
"Global Cell Phone Location," Axiom Navigation Inc., 2000-2001 (downloaded Oct. 19, 2002: www.axiomnav.com/Prod_Global/prod_global.asp).
"Global Locating Services," SkyBitz, webpage, p. 1, (downloaded Nov. 15, 2002: www.skybitz.com/services/gls.html).
"GLS Communicator," SkyBitz, webpages, pp. 1-2, (downloaded Nov. 15, 2002: www.skybitz.com/gls/communicator.html).
"Guide to Tracking Info.," Nippon Express, website page, p. 1 (downloaded Jun. 9, 2002: www.nittsu.co.jp/edoc/howtoe.htm).
"Introduction to SMS," by C. Tull of Anywhere YouGo.com, pp. 1-4 (downloaded:www.devx.com/wireless/articles/SMS/SMSintro-asp), Aug. 10, 2002.
"IO Data Develops GPS Adapter for I-Mode Mobile," AsiaBizTech, Sep. 17, 2002, pp. 1-2.
"Locate Networks: Our Service," Locate Networks, webpages, pp. 1-7 (downloaded Sep. 26, 2002: www.locatenetworks.com/).
"MMS phones: Don't believe the hype," CNN.com/SCI-TECH, Aug. 8, 2002, pp. 1-3.
"Mobile Location Based Services: Cell Tracking Devices of People & Thongs . . . ," pp. 1-2, (downloaded Aug. 10, 2002: http://3glocate.com).
"MoniTrack," Case Study, RJI Incorporated, webpages, pp. 1-2 (downloaded Mar. 16, 2002: www.rji.cc/technology/telematic.html).
"My ups.com Benefits," United Parcel Service of America, Inc. (UPS), webpage, p. 1 (downloaded Apr. 13, 2002: www.ups.com/myupsinfo/info/benefits?pnav=stdsservice).
"NavMate® Navigation System," Visteon Corporation, webpage, pp. 1-2 (downloaded Jun. 21, 2002: www.visteon.com/technology/automotive/navmate.html).
"News," SkyBitz, webpages, pp. 1-8, (downloaded Nov. 15, 2002: www.skybitz.com/about/news.html).
"Pakhound: Your Watchdog in the Shipping Industry," website pages, pp. 1-3 (downloaded Jun. 9, 2002: www.pakhound.com/fact.asp).
"Parkwatch and Wherenet Unveil the First Amusement Visitor Locating system," ParkWatch, Press Release, Jun. 27, 2000.
"pulver.com's Location Based Services Report," pulver.com, Inc., Oct. 2001, pp. 1-17 (downloaded Jun. 4, 2002: www.pulver.com/lbsreport/lastbsreport.02/oct01.txt).
"Radio Frequency Identification (RFID)," Case Study, RJI Incorporated, webpage, p. 1 (downloaded Mar. 16, 2002: www.rji.cc/technology/rfid.html).
"Real Time Location System (RTLS)," Case Study, RJI Incorporated, webpage, p. 1 (downloaded Mar. 16, 2002: www.rji.cc/technology/rtls.html).
"Real-Time Warehouse Tracking," Case Study, RJI Incorporated, webpages, pp. 1-2 (downloaded Mar. 16, 2002: www.rji.cc/casestudies/rtwarehousetracking.html).
"Savi Reusable Transport Container," Savi Technology, Inc., Apr. 30, 2002, pp. 1-2.
"Send images to i-mode phones," Mobile Media Japan, 2001, pp. 1-3.
"Ski Rental with Auto ID and Tracking," Case Study, RJI Incorporated, webpages, pp. 1-2 (downloaded Mar. 16, 2002: www.rji.cc/casestudies/skirentalcompany.html).
"SnapTrack and SignalSoft Corp. Team Up to Trial Location-based Information Service for GSM Test Group," Press Release, SnapTrack Inc., Dec. 6, 1999.

(56) References Cited

OTHER PUBLICATIONS

"SnapTrack Awarded Additional Key Patents for Enhanced GPS System," Press Release, SnapTrack Inc., Jan. 4, 2000.
"Start-up crams single chip with phone, GPS and Bluetooth," CNET Network, Inc. (ZDNET), Mar. 22, 2002 (downloaded: http://news.zdnet.co.uk/story/0,t284-x2107163,00.html).
"Status Icons/Messages," Yahoo! Messenger Help, Yahoo! Inc., 2002, pp. 1-2.
"Technical Applications of Our Current Technology," Aetherwire, webpages, pp. 1-4 (downloaded Mar. 16, 2002: www.aetherwire.com/CDROM/General/appl1.html).
"The Always on Network," Position Paper, Nortel Networks, 2002.
"Theme Park Visitors & Cashless Purchasing," Case Study, RJI Incorporated, webpages, pp. 1-2 (downloaded Mar. 16, 2002: www.rji.cc/casestudies/themepark.html).
"Track Shipments—Detailed Results," FedEx, webpages, pp. 1-2 (downloaded Oct. 29, 2002: www.fedex.com).
"Track Your FedEx Shipments via Email," FedEx, webpages, pp. 1-2 (downloaded Oct. 29, 2002: www.fedex.com).
"Tracking Helpful Tips," United Parcel Service of America, Inc. (UPS), webpages, pp. 1-2 (downloaded Jun. 1, 2002: www.ups.com/tracking/nm_help.html).
"Trimble and Rosum Team to Develop Universal Positioning Technology," Trimble Navigation, Inc., News Release, Feb. 27, 2003.
"Turning Position Into Knowledge," SkyBitz, webpage, p. 1, (downloaded Nov. 15, 2002: www.skybitz.com).
"UPS Package Tracking," United Parcel Service of America, Inc. (UPS), webpages, pp. 1-2 (downloaded Apr. 13, 2002: www.ups.com/tracking/tracking.html).
"UPS Wireless Solutions," United Parcel Service of America, Inc. (UPS), webpage, p. 1 (downloaded Apr. 13, 2002: www.ups.com/myupsinfo/info/wireless?pnav=stdsservice).
"Welcome to Iship, Inc.," iShip, Inc., webpages, pp. 1-2, (downloaded Jun. 9, 2002: www.iship.com/).
"Welcome to Traker Systems," Tracker Systems, webpages, pp. 1-2 (downloaded Jun. 9, 2002: www.trakersystems.com).
"What are Instant Messages?" Yahoo! Messenger Help, Yahoo! Inc., 2002, pp. 1.
"What is "3G" technology?" CNN.com/SCI-TECH, Oct. 22, 2001, pp. 1-3.
"What is a Friend List?" Yahoo! Messenger Help, Yahoo! Inc., 2002, pp. 1.
"Wherify Wireless and SiRF Team to Deliver Child Locator System," Wherify Wireless, Inc., Press Release, Mar. 19, 2001, pp. 1-2.
"Wherify Wireless Breakthrough in Location-Based Services," Mobilemag.com, Feb. 28, 2001, p. 1.
"Wherify Wireless GPS Locator for Kids User Guide," Wherify Wireless, Inc., 2003, pp. 1-106.
"Wherify Wireless Location Services," Wherify Wireless, Inc., webpages, pp. 1-5 (downloaded: Mar. 25, 2003: www.wherifywireless.com/prod_watches.htm).
"X-GPS™—Hybrid GPS Location Server Solution," Axiom Navigation Inc., 2000-2001 (downloaded Oct. 19, 2002: www.axiomnay.com/Prod_Global/x-gps.asp).
"Yahoo! Messenger—Sending Messages to a Mobile Phone," Yahoo! Messenger, Yahoo! Inc., 2002, pp. 1-7 (downloaded Oct. 27, 2002: http://messenger.yahoo.com/messenger/wireless/pc2sms/tour1.html(through /tour7.html)).
"Yahoo! Messenger for Text Messaging," Yahoo! Messenger, Yahoo! Inc., 2002, pp. 1-10 (downloaded Oct. 27, 2002: http://messenger.yahoo.com/messenger/wireless/smsmsgr/tour1.html (through /tour7.html)).
"Yahoo! Messenger for WAP," Yahoo Messenger, Yahoo! Inc., 2002 (tours 1-9), pp. 1-17 (downloaded Oct. 27, 2002: www.messenger.yahoo.com/messenger/wireless/wap/tour1.html(through /tour9.html)).
Accelerometers—General Purpose, LP Series, Crossbow Technology, Inc., data sheet, pp. 1-3 (downloaded Apr. 11, 2002: www.xbow.com/Products/Accelerometers.htm).

Bickers, "Eyes in the sky," SafeTzone Technology Corporation, webpages, 2001, pp. 1-3 (downloaded: www.safetzone.com/newsKiosk.asp).
Chertkoff, Rachel, "Vehicle Locator Systems," Pager Technology, pp. 1-2, 1998.
Commercial Uses for LoJack (webpage), LoJack Corporation, downloaded Jan. 22, 2000.
Crossbow Product Guide—Accelerometers, Crossbow Technology, Inc., webpages, pp. 1-3 (downloaded Apr. 11, 2002: www.xbow.com/Products/Accelerometers.htm).
Culler, D. et al., "MICA: The Commercialization of Microsensor Motes," Sensors (Apr. 1, 2002), pp. 1-5.
Darabi et al., "A 2.4-GHz CMOS Transceiver for Bluetooth," IEEE Journal of Solid-State Circuits, vol. 36, No. 12 (Dec. 2001), pp. 2016-2024.
Delphi and MobileAria Demonstrate True Hands Free In-Vehicle Mobile Productivity Services At CES, Press Release, Delphi Automotive Systems, Jan. 8, 2002 (downloaded Apr. 5, 2002: www.delphiauto.com/news/pressRelease/pr6828-01082002).
F. Rivera, "Special Report: Keeping Tabs on Your Teen," 7 News, Boston, Apr. 30, 2002, pp. 1-3.
FedEx Insight, FedEx, webpages, pp. 1-11 (downloaded Oct. 29, 2002: www.fedex.com).
Fraden, J., Handbook of Modern Sensors: Physics, Designs and Applications, Second Edition, Springer-Verlag (1996), cover, pp. 310-354, 384-431, 458-493, and 513-528.
GPS2000, Omega Research and Development, Inc., webpages, pp. 1-9 (pp. 7-9 pertain to an online tour) (downloaded Jul. 14, 2003: www.gps2000online.com/).
Grimes, et al., "Wireless Magnetoelastic Resonance Sensors: A Critical Review," Sensors, vol. 2 (Jul. 23, 2002), pp. 294-313.
Helfenstein et al., Circuits and Systems for Wireless Communications, Kluwer Academic Publishers (2000), cover pages, pp. 3-7, 9-34, and 37-47.
Hill et al., "System Architecture Directions for Networked Sensors," ACM/ASPLOS-IX (Nov. 2000), 12 pages.
IMVironment, Yahoo! Messenger Yahoo! Inc., 2002, pp. 1-12 (downloaded (including) Oct. 27, 2002: http://help.yahoo.com/help/us/mesg/imv/imv-01.html(through/index5.html).
J.Wrolstad, "Chrysler Claims First With Bluetooth Mobile Phone System," Wireless Newsfactor, Oct. 26, 2001.
K. Hill, "Prada Uses Smart Tags to Personalize Shopping," CRMDaily.com, Apr. 24, 2002., pp. 1-4.
Madou, Marc J., Fundamentals of Microfabrication: The Science of Miniaturization, Second Edition, CRC Press (2002) 139 pages.
K. Miyake, "Sharp to unveil 3G PDA-type cell phone," ITworld.com, Inc., Jan. 11, 2002.
Kleinknecht, William, "Juvenile authorities want satellite tracking for felons," The Star-Ledger of New Jersey, Nov. 18, 1997.
LoadTrak, pp. 1-2 (downloaded Jun. 4, 2002: www.load-trak.com).
Mainwaring et al., "Wireless Sensor Networks for Habitat Monitoring," ACM (Sep. 28, 2002) pp. 88-97.
Marek, "The Unstoppable SnapTrack," Wireless Week, Dec. 18, 2000.
Motorola Consumer Catalog: Pagers (webpage), Motorola, Inc., downloaded Jan. 19, 2000.
My.Roadway! Roadway Express, Inc., webpages, pp. 1-2, (downloaded Jun. 9, 2002: www.quiktrak.roadway.com/cgi-bin/quiktrak).
Package, Dictionary.com, http://dictionary.reference.com/browse/package (last accessed Nov. 6, 2013), 3 pgs.
Packtrack™, PackTrack.com, webpages, pp. 1-2 (downloaded Jun. 9, 2002: www.packtrack.com).
Precision Accelerometers, PCB Piezoelectronics Products—SVS Division, webpages, pp. 1-2 (downloaded Apr. 11, 2002: www.pcb.com/products/sys/index.html).
Rabinowitz and Spilker, Jr., "A New Positioning System Using Television Synchronization Signals," Rosum Corporation, pp. 1-11 (downloaded May 21, 2003).
Rabinowitz and Spilker, Jr., "Positioning Using the ATSC Digital Television Signal," Rosum Corporation Whitepaper, Rosum Corporation (downloaded May 21, 2003).
Razavi, Behzad, RF Microelectronics, Prentice Hall (1998), cover pages, pp. 1-10, and 118-297.

(56) References Cited

OTHER PUBLICATIONS

Real Time Locating System, Executive Summary, Technology Systems International, Inc., 2007.
Rofougaran et al., "A Single-Chip 900-MHz Spread-Spectrum Wireless Transceiver in 1-μm CMOS—Part II: Receiver Design," IEEE Journal of Solid-State Circuits, vol. 33, No. 4 (Apr. 1998), pp. 535-547.
Ryan, "Catching up with Dick Tracy," San Francisco Chronicle, news article, Mar. 18, 2002.
Sand Piper GPS Receiver, Specification sheet by Axiom Navigation Inc. (www.axiomnav.com) 2006.
Senturia, Stephen D., Microsystem Design, Kluwer Academic Publishers (2001), cover pages, and pp. 3-14.
SiRF Debuts Revolutionary Architecture and Technologies to Further Drive GPS into the Mainstream, SiRF.com, Aug. 16, 1999 (archived Dec. 22, 1999), http://web.archive.org/web/19991222194810/http:/www.sirf.com/as_prss2_3.htm, 4 pgs.
Smart Antenna, Specification sheet by Axiom Navigation Inc. (www.axiomnav.com) 2008.
SnapTrack—Privacy Protection (webpage), SnapTrack Inc., downloaded Jan. 19, 2000.
SnapTrack—Technology At Work (webpage), SnapTrack Inc., downloaded Jan. 19, 2000.
SnapTrack in Action (webpage), SnapTrack Inc., downloaded Jan. 19, 2000.
Steyaert et al., "A 2-V CMOS Cellular Transceiver Front-End," IEEE Journal of Solid-State Circuits, vol. 35, No. 12, Dec. 2000, pp. 1895-1907.
Stilp, Louis A., "Examining the Coming Revolution in Location Services," pp. 1-11, Jun. 27, 2017.
Strom, Stephanie. "A Wild Sleigh Ride at Federal Express," The New York Times, Dec. 20, 1994.
Swift A2 GPS Receiver, Specification sheet by Axiom Navigation Inc. (www.axiomnav.com) 2010.
Swift B2 GPS Receiver, Specification sheet by Axiom Navigation Inc. (www.axiomnav.com) 2010.
TruePosition Virtual Brochure (webpage), TruePosition, Inc, Jun. 27, 2017.
Wong, "Fishers, golfers join the rush to GPS," San Jose Mercury News, news article, Mar. 25, 2002.
Notice of Allowance for U.S. Appl. No. 14/923,882, dated Jul. 25, 2018.
Office Action for U.S. Appl. No. 13/802,641, dated Oct. 24, 2018.
Office Action for U.S. Appl. No. 14/923,882, dated Jan. 29, 2019.
Office Action for U.S. Appl. No. 13/802,641, dated Jun. 7, 2019.
Van Diggelen et al. "Indoor GPS," *GPS World*, Sep. 2001, vol. 12, Issue 9, p. 50. 5pgs.
Syrjarinne, J. "Keeping Time with Mobiles," *GPS World*, Jan. 2001, vol. 12, Issue 1, p. 22, 7pgs.
LaMance et al. "Assisted GPS," *GPS World*, Mar. 2002, vol. 13, Issue 3, p. 46-51.
Heinrichs et al. "Synergies in Handset Architecture," *GPS World*, Mar. 2002, vol. 13, Issue 3, p. 30-39.
Hightower et al. "Location Systems for Ubiquitous Computing," *Computer*, Aug. 2001, vol. 34, Issue 8, p. 57-66.
Bahl et al. "RADAR: An In-Building RF-based User Location and Tracking System," *Proc. of the IEEE Conf. on Comp. Comm., INFOCOM2000, 19th Annual Joint Conf. of the IEEE Computer and Communications Societies*, Mar. 2000, 10 pgs.
Palenchar, J. "E911 Update: What Major Carriers Have Planned," *TWICE: This Week in Consumer Electronics*, Oct. 8, 2001, vol. 16, Issue 23, p. 36.
Office Action for U.S. Appl. No. 14/923,882, dated May 1, 2019.
Office Action for U.S. Appl. No. 15/933,578, dated Apr. 12, 2019.
Office Action for U.S. Appl. No. 15/933,578, dated Aug. 7, 2019.
Notice of Allowance for U.S. Appl. No. 13/802,641, dated Sep. 16, 2019.
Benefon Esc! Owner's Manual, Publication No. YZ2400-4*, © Benefon Oyj, 2002, pp. 169.
Office Action for U.S. Appl. No. 16/354,122, dated Oct. 28, 2019.
Notice of Allowance for U.S. Appl. No. 14/923,882, dated Jan. 23, 2020.
Notice of Allowance for U.S. Appl. No. 16/354,122, dated Jan. 9, 2020.
Notice of Allowance for U.S. Appl. No. 13/802,641, dated Jan. 6, 2020.

METHOD AND APPARATUS FOR IDENTIFYING AND PRESENTING LOCATION AND LOCATION-RELATED INFORMATION

CROSS REFERENCE TO RELATED APPLICATIONS

This application is a continuation of U.S. patent application Ser. No. 14/874,782, filed Oct. 5, 2015, now U.S. Pat. No. 9,723,442, and entitled "METHOD AND APPARATUS FOR IDENTIFYING AND PRESENTING LOCATION AND LOCATION-RELATED INFORMATION," which is hereby incorporated herein by reference, and which, in turn, is a continuation of U.S. patent application Ser. No. 14/519,503, filed Oct. 21, 2014, now U.S. Pat. No. 9,219,988, and entitled "METHOD AND APPARATUS FOR LOCATION IDENTIFICATION AND PRESENTATION," which is hereby incorporated herein by reference, which, in turn, is a continuation of U.S. patent application Ser. No. 13/933,770, filed Jul. 2, 2013, now U.S. Pat. No. 8,886,220, and entitled "METHOD AND APPARATUS FOR LOCATION IDENTIFICATION," which is hereby incorporated herein by reference, which, in turn, is a continuation of U.S. patent application Ser. No. 11/705,339, filed Feb. 10, 2007, now U.S. Pat. No. 8,611,920, and entitled "METHOD AND APPARATUS FOR LOCATION IDENTIFICATION," which is hereby incorporated herein by reference, which, in turn, is a continuation of U.S. patent application Ser. No. 10/397,472, filed Mar. 26, 2003, now U.S. Pat. No. 7,218,938, and entitled "METHOD AND APPARATUS TO ANALYZE AND PRESENT LOCATION INFORMATION," which is hereby incorporated herein by reference, which, in turn, is a Continuation-In-Part of U.S. patent application Ser. No. 09/797,517, filed Feb. 28, 2001, now U.S. Pat. No. 7,366,522, and entitled "METHOD AND SYSTEM FOR LOCATION TRACKING," which is hereby incorporated herein by reference, and which claims the benefit of U.S. Provisional Patent Application No. 60/185,480, filed Feb. 28, 2000, and entitled "METHOD AND SYSTEM FOR LOCATION TRACKING," which is hereby incorporated herein by reference.

The prior application Ser. No. 10/397,472 also claims benefit of: (i) U.S. Provisional Patent Application No. 60/444,198, filed Jan. 30, 2003, and entitled "SYSTEM, METHOD AND APPARATUS FOR ACQUIRING, PRESENTING, MONITORING, DELIVERING, MANAGING AND USING STATUS INFORMATION," which is hereby incorporated herein by reference; (ii) U.S. Provisional Patent Application No. 60/418,491, filed Oct. 15, 2002, and entitled "SYSTEM, METHOD AND APPARATUS FOR ACQUIRING, PRESENTING, MONITORING, DELIVERING, MANAGING AND USING STATUS INFORMATION," which is hereby incorporated herein by reference; (iii) U.S. Provisional Patent Application No. 60/404,645, filed Aug. 19, 2002, and entitled "SYSTEM, METHOD AND APPARATUS FOR ACQUIRING, PRESENTING, MONITORING, DELIVERING, MANAGING AND USING POSITION AND OTHER INFORMATION," which is hereby incorporated herein by reference; and (iv) U.S. Provisional Patent Application No. 60/375,998, filed Apr. 24, 2002, and entitled "SYSTEM, METHOD AND APPARATUS FOR ACQUIRING, PRESENTING, MANAGING AND USING POSITION INFORMATION," which is hereby incorporated herein by reference.

This application is also related to: (i) U.S. patent application Ser. No. 10/397,473, filed Mar. 26, 2003, now U.S. Pat. No. 6,975,941, and entitled "METHOD AND APPARATUS FOR INTELLIGENT ACQUISITION OF POSITION INFORMATION;" (ii) U.S. patent application Ser. No. 10/397,637, filed Mar. 26, 2003, now U.S. Pat. No. 7,212,829, and entitled "METHOD AND SYSTEM FOR PROVIDING SHIPMENT TRACKING AND NOTIFICATIONS;" (iii) U.S. patent application Ser. No. 10/397,641, filed Mar. 26, 2003, now U.S. Pat. No. 7,905,832, and entitled "METHOD AND SYSTEM FOR PERSONALIZED MEDICAL MONITORING AND NOTIFICATIONS THEREFOR;" (iv) U.S. patent application Ser. No. 10/397,640, filed Mar. 26, 2003, now U.S. Pat. No. 7,321,774, and entitled "INEXPENSIVE POSITION SENSING DEVICE;" (v) U.S. patent application Ser. No. 10/397,474, filed Mar. 26, 2003, now U.S. Pat. No. 7,403,972, and entitled "METHOD AND SYSTEM FOR ENHANCED MESSAGING;" (vi) U.S. patent application Ser. No. 10/397,512, filed Mar. 26, 2003, and entitled "APPLICATIONS OF STATUS INFORMATION FOR INVENTORY MANAGEMENT."

BACKGROUND OF THE INVENTION

GPS (Global Positioning System) has been used extensively for navigation, positioning, and other research applications. It includes a group of satellites transmitting very precise signals. The nominal GPS Operational Constellation consists of 24 satellites that orbit the earth with 12-hour periods. These space vehicles (SV's) send radio signals that consist of time-tagged data bits marking the time of transmission, and information on the locations of the SV's, at the time they are transmitted. GPS receivers convert the received SV signals into the receivers' position. Four satellites are required to compute the four dimensions of X, Y, Z (position) and time. GPS receivers at precisely known reference locations can provide corrections and relative positioning data for receivers at other locations. Another use of GPS is to provide precise time and frequency standards through the use of precise clocks on-board the SV's.

For about two decades, GPS receivers have been used primarily in the outdoor environment. It is more challenging to use them indoors. The signal strengths from the SV's can be much reduced, such as by two orders of magnitude. A number of companies have been developing indoor GPS receivers. They are enticed by the US Federal Communications Commission's E911 telecommunication initiatives, which require wireless phone providers to locate any phone making a 911 emergency call.

The E911 initiative will greatly increase the proliferation of GPS devices. Telematics—the field of mobile services delivered wirelessly to in-vehicle devices—will further help GPS penetrate into different sectors of the society. One of the most visible manifestations of telematics is GPS-based navigation systems. They provide turn-by-turn directions and other information wirelessly to vehicle operators.

The amount and availability of GPS information will dramatically increase in the coming years. One challenge this will present is how to effectively use such information. There are needs for techniques to efficiently and intelligently analyze, process and present GPS information.

SUMMARY OF THE INVENTION

In general terms, the present invention pertains to the analysis of location information and/or the presentation of such information in an easy-to-digest manner.

Each piece of location information can include a piece of location-designating information and a piece of location-related information. Location-designating information is primarily for identifying location. In one embodiment, the location-designating information is longitudinal and latitudinal coordinates. Location-related information is information related to location-designating information. The location-designating information and the location-related information can be supplied by a mobile device. Multiple pieces of location-designating information can be retrieved and processed.

In one embodiment, each piece of location-designating information can be transformed into a label to help identify a location. To better identify locations, the process of transforming location-designating information into labels can use location-related information. For example, the mobile device is very close to the boundary of a theatre and a bookstore, and is about 40 feet from the ground level. One piece of location-related information is information on the environment. It indicates that the theatre has only one floor, while the bookstore has three floors. Since only the bookstore has more than one level and the mobile device is about 40 feet from the ground level, the mobile device is in the bookstore, not the theatre.

In another embodiment, the amount of location information can be reduced. An entire area can, for example, be represented by a single label. For analysis, all of the location-designating information pertaining to a given area can be compressed (or consolidated) into one piece of location-designating information related to the label. This compression (or consolation) process can be impacted or assisted by location-related information. For example, if a piece of location-related information changes by more than a pre-set value, the corresponding piece of location information will be retained.

To better present location information in an easy-to-digest manner, location information can be compared to standards. The standards can be related to time.

Presentation can be visually on a display with respect to a reference location. For example, the amount of detail displayed between the location of the mobile device and the reference location can dynamically change. This change can depend on the distance between the location of the mobile device and the reference location. Such an implementation is helpful particularly in situations when the size of the display is fixed.

The invention can be implemented in numerous ways, including as a method, system, device, or computer readable medium. Different embodiments of the invention will be discussed in subsequent sections.

Other aspects and advantages of the present invention will become apparent from the following detailed description, which, when taken in conjunction with the accompanying drawings, illustrates by way of examples the principles of the invention.

Figure 1A:
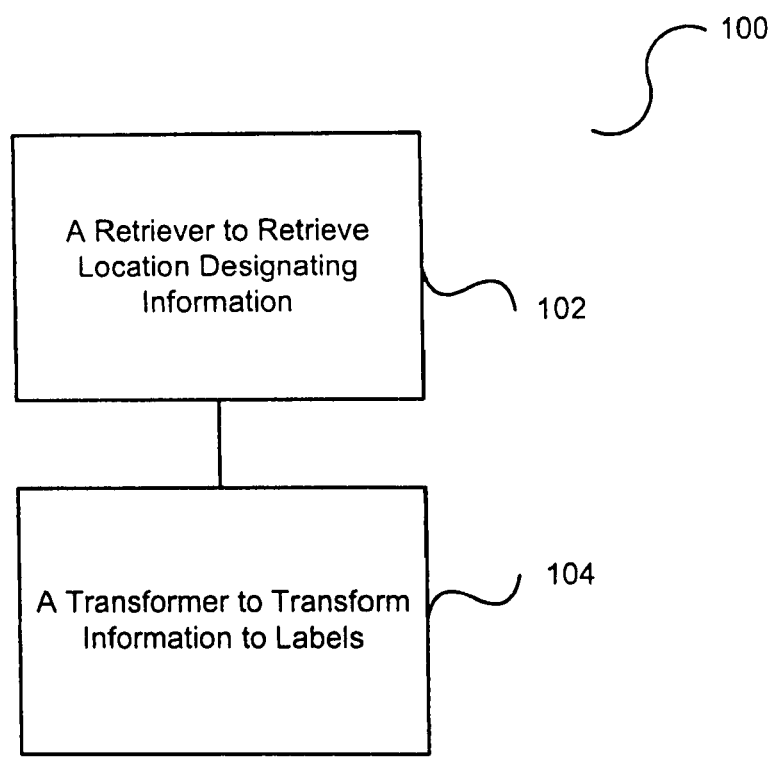
FIG. 1(a) shows one embodiment of the present invention.

Same numerals in FIGS. 1-8 are assigned to similar elements in all the figures. Embodiments of the invention are discussed below with reference to FIGS. 1-8. However, those skilled in the art will readily appreciate that the detailed description given herein with respect to these figures is for explanatory purposes as the invention extends beyond these limited embodiments.

DETAILED DESCRIPTION OF THE INVENTION

The present invention pertains to the analysis of location information and/or the presentation of such information in an easy-to-digest manner. In one embodiment, there are two types of location information. One type is location-designating information, and the other is location-related information. Location-designating information is primarily for identifying locations. The location-designating information can be longitudinal and latitudinal co-ordinates, or raw measurements (or pseudo-ranges) from GPS satellites. Location-related information is additional information that is related to a location. As will be explained in detail below, the location-designating information and the location-related information can be used in analyzing and presenting location information.

There can be a number of ways to generate location-related information. Some of the information can be automatically captured by additional sensors. Other can be entered by a person. For example, a user with a mobile device is in a bookstore. The mobile device is location-aware (e.g., GPS enabled) and can capture location-designating information. One type of location-aware mobile device is a mobile device that includes a GPS device (or GPS receiver). The user can add comments about the bookstore, or enter personal information and digitized pictures into his mobile device. The URL of the bookstore can be included. The user can be next to a house with a Wi-Fi network that allows the mobile device to get online. These can all be information related to the location, and can be automatically provided, or entered by the user. Such location-related information can be coupled to location-designating information, such as for identifying the location of the bookstore.

The company or organization at the location can broadcast certain information for attachment. For example, the bookstore can broadcast the URL of its website, or of special offers using the Bluetooth standards. Assume that the mobile device has Bluetooth technologies, and is Bluetooth enabled. With authorized reception of data, the mobile device can capture the broadcast signal and attach the information as a piece of location-related information.

Other sensors can be coupled to the mobile device to capture location-related information. For example, there can be a temperature sensor, a digital compass, a humidity sensor, a pressure sensor, a wind-speed sensor, an acceleration sensor or an accelerometer, a chemical sensor detecting chemical substance, a mechanical stress sensor, and/or other sensors to provide location-related information. The sensor data can be electronically coupled to corresponding location-designating information as location-related information.

Some of these sensors can be micro-electro-mechanical systems or micromachines. These sensors can be integrated with driving, controlling and signal processing electronics, and the integration can be monolithic.

The present invention can be implemented in a computing system. The computing system can be a standalone computing apparatus, a server computer, a client computer, a server computer with one or more client computers, or a computer in a peer-to-peer network. A client computer can be a thin-client. A client computer communicates to the server computer through a communication link or computer network. In one embodiment, a server computer, which can be software and/or hardware, is capable of responding to a communication initiated by a client computer with respect to an application. Similarly, a client computer, which can be software and/or hardware, is capable of initiating communication with a server computer with respect to an application. The computing system can also be a handheld computer, a personal digital assistant or a cellular phone.

The computing system can include a bus connecting a number of components, such as a processing unit, a main memory, an I/O controller, a peripheral controller, a graphics adapter, a circuit board and a network interface adapter. The I/O controller can be connected to components, such as a hard disk drive or a floppy disk drive. The peripheral controller can be connected to one or more peripheral components, such as a keyboard or a pointing device. The graphics adapter can be connected to a monitor. The circuit board can be coupled to audio signals; and the network interface adapter can be connected to the network, which can be the Internet, an intranet, or other forms of networks. The processing unit can be an application specific chip. The computing system can include more than one processor, and can process information through parallel processing.

The present invention can also be implemented as a computer readable medium including at least computer program code for analyzing and/or presenting location information according to different embodiments described.

FIG. 1(a) shows a location resolution system 100 according to one embodiment of the present invention. The location resolution system 100 includes a retriever 102 to retrieve location information, and a transformer 104 to transform location-designating information into labels. Typically, location-designating information includes a set of numerical values. They can be raw measurements from GPS devices, or longitudinal and latitudinal coordinates, or other numerical representation of locations. It is not easy for a person to know where a location is just by looking at these numerical values.

In one embodiment of the present invention, labels are representations of locations that are easier to understand than the numerical representations. For example, instead of the set of longitudinal and latitudinal coordinates—W122° 26' 52.9" and N37° 48' 11.2"—its corresponding label can be the Exploratorium, the name of the place (e.g., business, home or other point of interest) with that set of coordinates. A label can be the physical address of the place. In the case of the Exploratorium, it is 3601 Lyon Street, San Francisco, Calif. 94123. Labels can help people better identify a place than a set of numbers.

In transforming location-designating information into labels, the transformer can access a location database. In one embodiment, a previously-created database maps location-designating information, such as longitudinal and latitudinal co-ordinates, to their corresponding labels. The location database can be in the mobile device or in a remote server wirelessly coupled to the mobile device. Access to the location database can be restricted through password protection or other techniques.

The system identifies the labels corresponding to location-designating information, and retrieves such information from the database. The system can be in the mobile device or it can be in a remote server. Labels can then replace the location-designating information, and can couple to the corresponding location-related information. For example, the location-related information can be stored along with the labels in the mobile device, such as a personal-digital assistant. In another example, the location-related information is stored along with the labels in a remote computer.

In one embodiment, the location information can then be queried by a query processor. The query processor can be used by a person to query the information. As an example, one can search for the label, "Exploratorium". The following information can be retrieved in a table format:

| | |
|---|---|
| Location | Exploratorium |
| Address | 3601 Lyon Street, San Francisco, CA 94123 |
| GPS co-ordinates | W 122° 26' 52.9" N 37° 48' 11.2" |
| Web site | www.exploratorium.edu |
| Miscellaneous information | . . . |

A history of when the user was at the location can also be retrieved, as exemplified by the following table:

| From | To | Date | On | Comments | Other Information |
|---|---|---|---|---|---|
| 1:05 pm | 3:02 pm | Feb. 2, 2002 | Saturday | Lucas likes the place. Should visit more often. | A picture of Lucas we took outside: Lucas.tif |
| 2:00 pm | 3:10 pm | Mar. 2, 2002 | Monday | Andy was fascinated by the anatomy of a human body. | A web site on human anatomy: http://www.bartleby.com/107/ |

The information can be queried in different ways. For example, one can find out where the user was on Mar. 2, 2002 at 3 pm through standard searching algorithms.

Figure 1B:
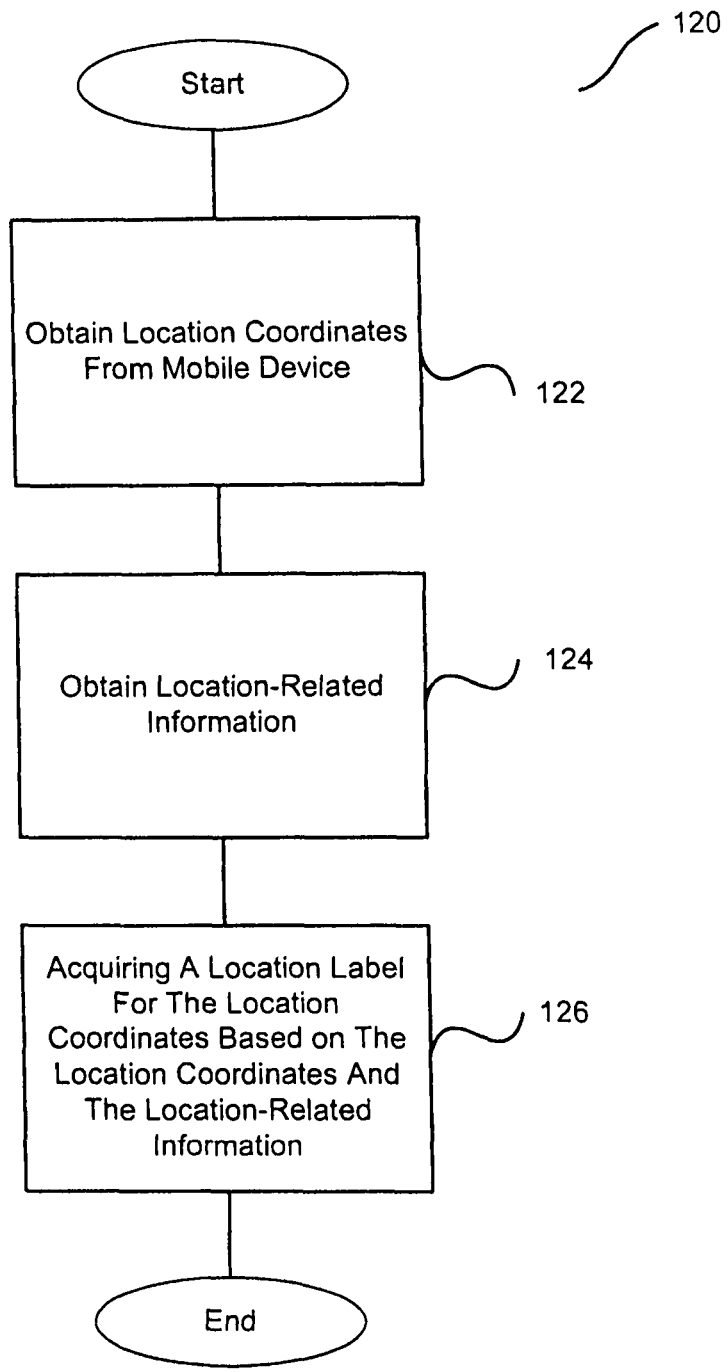
FIG. 1(b) is a flow diagram of label processing according to one embodiment of the invention.

FIG. 1(b) is a flow diagram of label processing 120 according to one embodiment of the present invention. The process 120 can be performed on a server or a client.

The label processing 120 initially obtains 122 location coordinates provided by the mobile device. The mobile device is location aware and thus typically captures location coordinates. Additionally, location-related information is obtained 124. The location-related information is associated with the location coordinates. The location-related information can also be provided by the mobile device. For example, the mobile device can include one or more sensors or input devices to acquire the location-related information. Then a location label can be acquired 126 for the location coordinates based on the location coordinates and the location related information.

Through use of both the location coordinates and the location-related information, more accurate location labels are able to be acquired. The location labels are more descriptive of actual location and are more user-friendly than the location coordinates. The acquisition of location labels can also be considered as a transformation of location coordinates into location labels.

In many situations, it may not be clear where a location corresponding to a piece of location-designating information really is. The resolution of GPS devices can have errors of 15 meters or more. Based on the location-designating information, the user may be at one or more locations. For example, a multi-story bookstore is directly adjacent to a single-story theatre. The user with a mobile device, such as a cell phone having a GPS device, might be standing at a window of the bookstore, with the window facing the theatre. The cell phone can transmit the location-designating information or the corresponding labels to a remote system of the invention. Based on the accuracy of the GPS device, the system is aware that the user is in the vicinity of the bookstore and the theatre. But the system may not be able to pinpoint whether the user is in the bookstore or the theatre.

Figure 2:
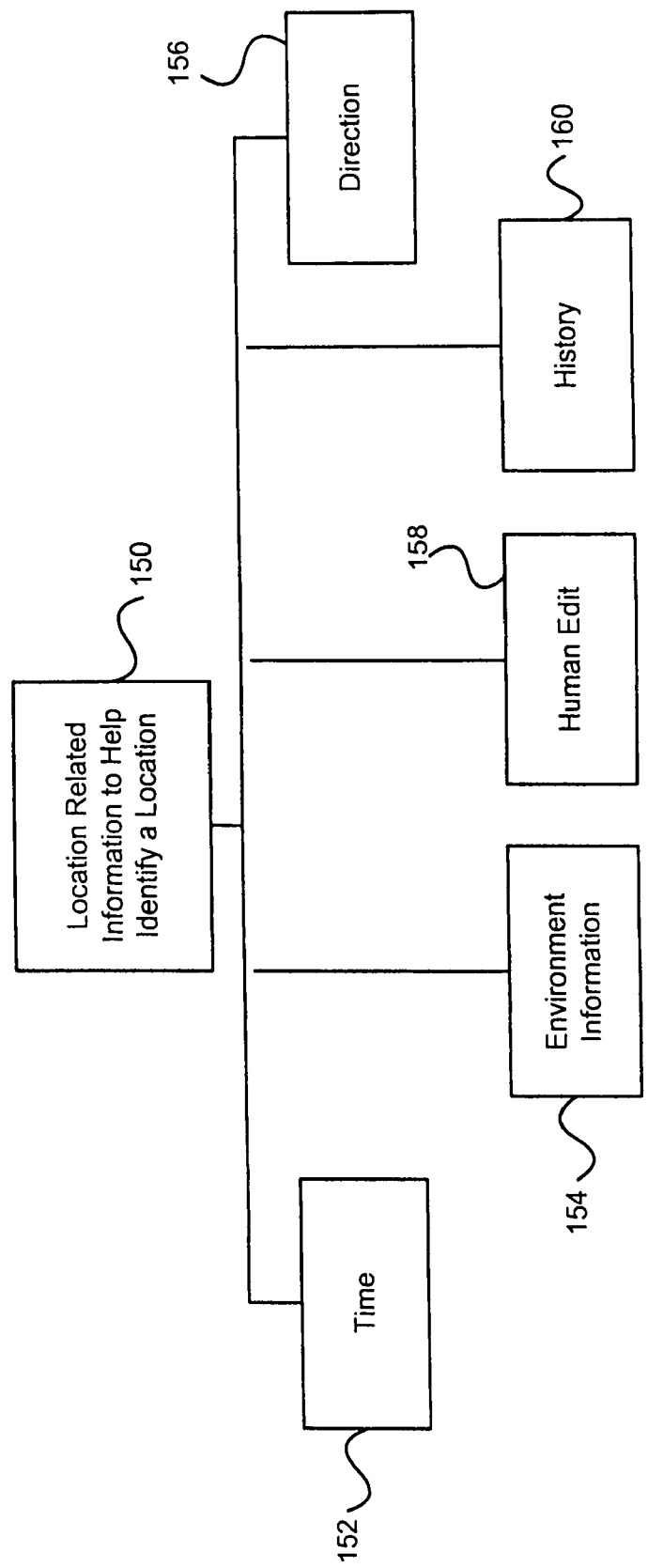
FIG. 2 shows examples of location-related information to help identify a location in the present invention.

FIG. 2 shows examples of location-related information to help identify a location. One approach is to use a piece of information regarding the environment 154 where the person is located. Location-designating information from a GPS device can identify not only the longitudinal and latitudinal coordinates, but also the elevation. Assume the elevation coordinate indicates that the person is about 40 feet from the ground level. Based on information regarding the environment, only the bookstore has more than one level, the user is in the bookstore. Thus, depending on the location-related information of the bookstore having multi-story, the transformer identifies the bookstore as the correct location. In this example, the name of the bookstore can be the transformed label.

Another approach to better define a location is to use the time 152 information provided by GPS. For example, at time x, the user is close to the junction of the theatre and the bookstore. Assume at time (x+10 seconds), the person has moved to the center of the bookstore. Based on this second piece of information, the system infers that at time x, the user was in the bookstore, not the theatre. In this approach, location information at different time frames are evaluated or collected to better define a location.

Yet another approach to better define a location is to use direction 156 information. Again, assume that the user at the junction of the theatre and the bookstore. One rule can be that while the user is at the junction, the user is in the bookstore if he is moving in the direction of the bookstore. One approach to measure direction depends on taking two pieces of location information at two different time frames, such as 5 seconds apart. Based on the second location, the direction of travel at the first location can be identified.

Instead of using location information at different time frames, direction 156 can be provided by a direction sensor (e.g., digital compass) in the mobile device (e.g., cell phone). Such direction information can be coupled to the location-designating information, and transmitted to another computing apparatus to have the location information analyzed. In another embodiment, the information is not transmitted, but is analyzed in the mobile device. Based on the analysis, the mobile device can display the label on its screen.

It could also be up to the user 158 to better define the location. The mobile device can identify a few choices for the user to select. For example, a display on the mobile device can show the options of both the bookstore and the theatre. The user can select one of them by using a pointing device on a digitizer, a scrolling function to allow selection, or a voice recognition system, where the user can verbally make the selection.

Also, a history 160 of prior locations or frequently visited locations could be used to better define the location. For example, based on the history, the user visits a bookstore at least ten times more than its adjacent theatre. Then, if the location-designating information indicates that the user can be in the bookstore or in its adjacent theatre, one rule will assume the user to be in the bookstore. The history 160 can also be used to make processing more efficient. For example, if the history 160 indicates that the current location is same or proximate to a prior location, the current location can be deemed to be the same as the prior location, typically with minimal processing.

The amount of location information can be quite large. In one embodiment, a system of the invention also includes a compressor to compress the amount of location information.

Figure 3A:
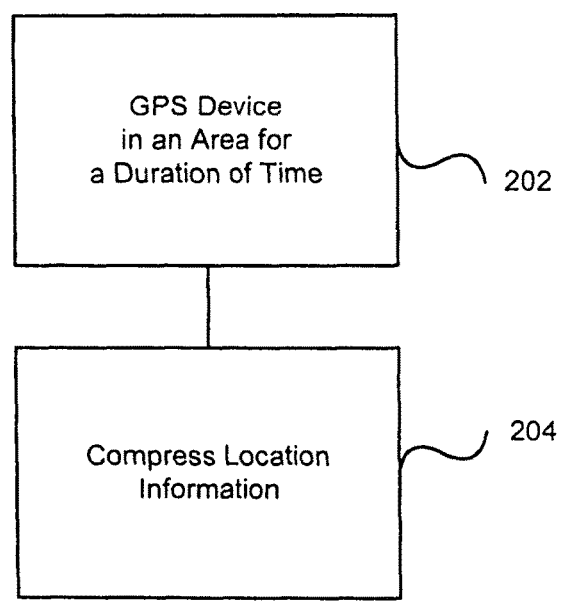
FIG. 3(a) shows one embodiment of compressing location information in the present invention.

FIG. 3(a) shows one embodiment of compressing location information according to one embodiment of the present invention. In this approach, the user with a mobile device coupled to a GPS device is in an area for a duration of time 202. During this time period, the device collects sets of location information, each at a specific time. Through analysis, it has been determined that the device is in the same area during this time period. For example, every set of longitudinal and latitudinal coordinates is mapped to the same label. The compressor will compress all of the location-designating information 204 to one set, indicating the device being in the area during that time period.

In one approach, the compressor retrieves sets of longitudinal and latitudinal co-ordinates of the GPS device, and transforms them to labels. As the compressor transforms a set of longitudinal and latitudinal coordinates of a piece of location information into a label, it also compares that label with the label from the immediately prior time. If the two labels are the same, the compressor will not store the location information of that label for additional analysis. In one embodiment, additional pieces of location-designating information in the same zone as the immediately earlier piece will not be further analyzed. If two labels are the same, they can be considered to be in the same zone; if two labels are within a certain pre-determined distance from one another, they can be considered as to be in the same zone; or if the distance between the two sets is less than a pre-set value, again, they can be considered as to be in the same zone.

In another approach, if the distance between two sets of location-designating information is less than a pre-set value (e.g., predetermined value, tolerance, range or offset), the compressor will not store the second piece of location information, which is the location information at a later time. This process can continue. For example, the compressor can determine the distance between a third set and the first set to be still less than the pre-set value. Again, the third set of location information need not be stored.

Under certain conditions, even if the device has not moved out of an area designated by a label, there might still be changes in certain information, warranting the keeping of location information, or at least some portion of it. For example, the user is transporting humidity-sensitive chemicals within a certain area of the city, and suddenly it rains heavily, significantly changing the humidity. It might be desirable to be aware of the location and time when such changes occurred.

Figure 3B:
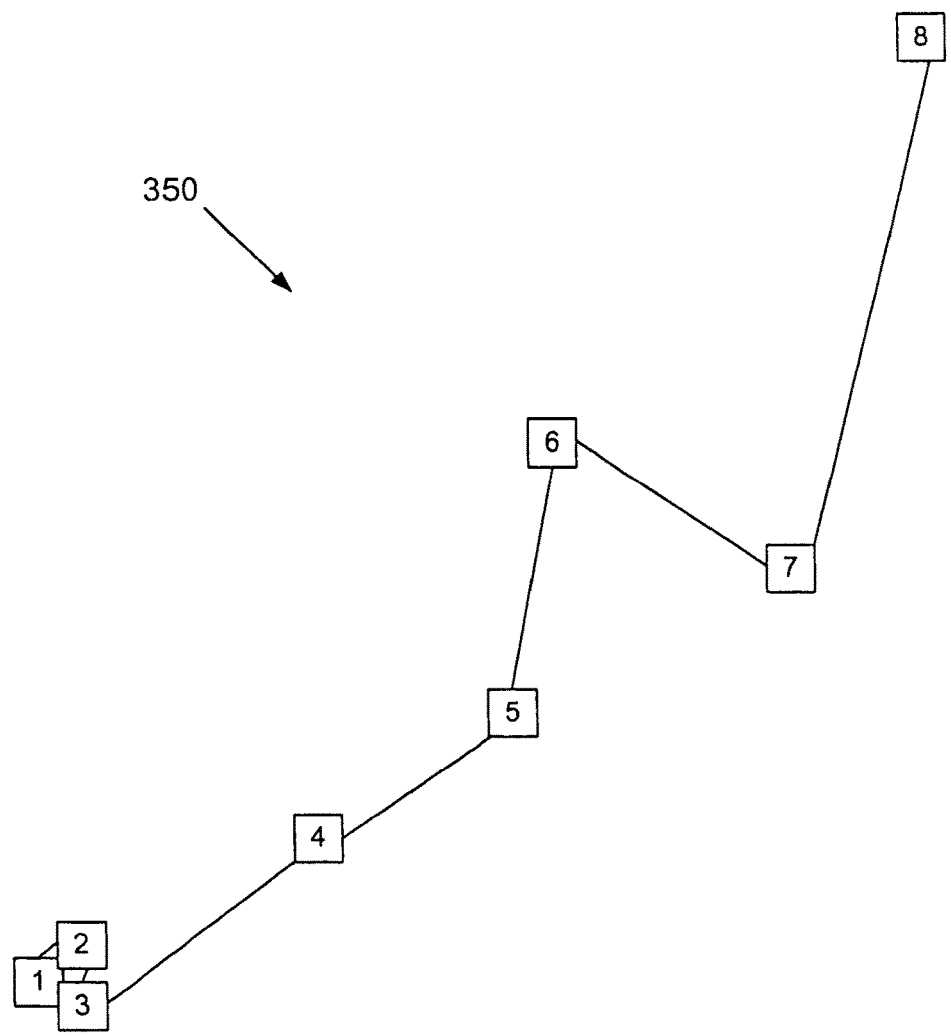
FIG. 3(b) illustrates an exemplary path of movement of a location-designating device over a period of time.

FIG. 3(b) illustrates an exemplary path 350 of movement of a location-designating device over a period of time. Namely, the exemplary path 350 is composed of a sequence of eight (8) locations where location-designating information and location-related information were captured. A sequence of locations of a path can be processed to compress what would otherwise be large and unmanageable amounts of information. Once compressed, the quantity of data is reduced and the information is more user-friendly. Table 1 provided below illustrates exemplary location-designating information and location-related information that have been captured for the eight (8) locations shown in FIG. 3(b).

TABLE 1

|       | 1           | 2           | 3           | 4           | 5           | 6           | 7       | 8           |
|-------|-------------|-------------|-------------|-------------|-------------|-------------|---------|-------------|
| Label | —           | —           | —           | —           | —           | —           | —       | —           |
| Long. | X1          | X2          | X3          | X4          | X5          | X6          | X7      | X8          |
| Lat.  | Y1          | Y2          | Y2          | Y4          | Y5          | Y6          | Y7      | Y8          |
| Time  | 1.00 pm     | 1.15 pm     | 1:30 pm     | 1:45 pm     | 2.00 pm     | 2:15 pm     | 2:30 pm | 2:45 pm     |
| Date  | Jan. 1, 2002 | Jan. 1, 2002 | Jan. 1, 2002 | Jan. 1, 2002 | Jan. 1, 2002 | Jan. 1, 2002 |         | Jan. 1, 2002 |
| Temp. | 90          | 90          | 90          | 89          | 89          | 88          | 88      | 87          |
| Other | —           | —           | —           | —           | —           | —           | —       | —           |

The data stored in the Table 1 can represent the raw data provided by the location-designating device. At this point, in this embodiment, the descriptive labels are not known, but the longitude and latitude coordinates are known (e.g., provided by GPS device). The date and time can be provided by a GPS device or by a clock within the location-designating device. Further, other sensors can provide various other location-related information. In this example, the other location-related information includes at least temperature and an "other" category to represent one or more other pieces of information.

The data stored in Table 1 can then be compressed to a more compact and manageable form. Table 2 provided below illustrates exemplary compression processing on the data within Table 1.

the compressor determines that these location are to be treated as the same location. Here, based on information from a location database, assume that the location is the Exploratorium in San Francisco, Calif. In effect, these location points can collapse into a single location point. However, any difference between the individual location points (such as their location-related information) can be preserved if desired. The other locations 4-8 in Table 1 (now locations 2-6 in Table 2) are deemed to represent different locations and are individually processed for labels. Once a label is identified, the longitude and latitude coordinates can be eliminated if desired.

The exemplary compression processing shown with Table 2 is only one simplified example; hence, it should be understood that compression processing can be performed in a wide variety of different ways.

Figure 3C:
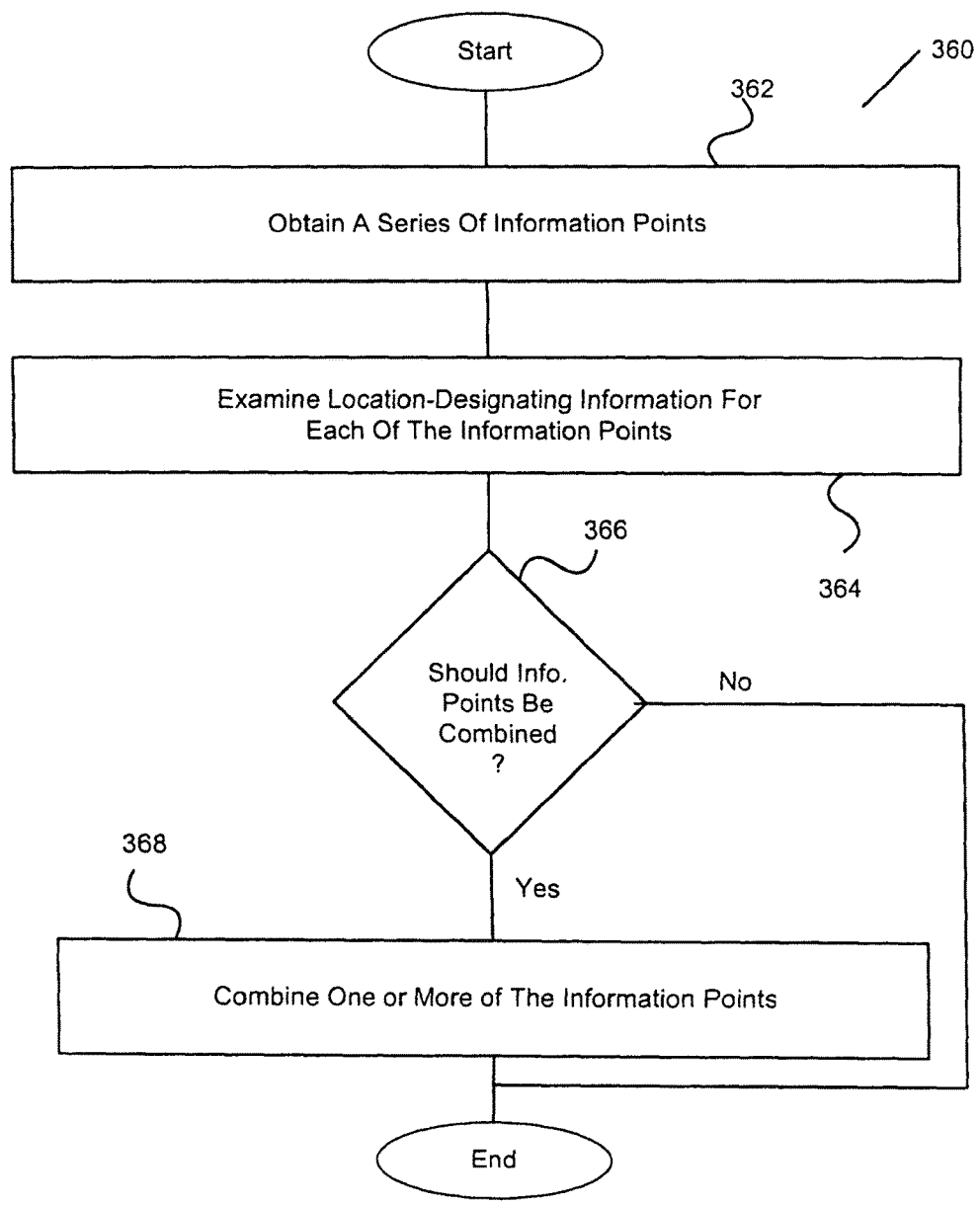
FIG. 3(c) is a flow diagram of consolidation processing according to one embodiment of the invention.

FIG. 3(c) is a flow diagram of consolidation processing 360 according to one embodiment of the invention. The consolidation processing 360 can be performed on a server or a client or a computing device in a peer-to-peer network.

The consolidation processing 360 initially obtains a series of information points 362. The series can be ordered based on the time each point is acquired. The series of information points are, for example, obtained from storage or directly from a mobile device. Each of the information points typically has location-designating information and location-related information. Next, the location-designating information for each of the information points is examined 364. A decision 366 then determines whether any of the information points should be combined. Here, in this embodiment, the decision 366 is based on the location-designation information for the information points. For example, if two consecutive location-designation information are substantially matched, the two information points should be combined. One rule regarding matching can be that if two consecutive location-designation information are close to each other, such as within 5 meters apart, they are considered as

TABLE 2

| point | 1 | 2 | 3 | 4 | 5 | 6 |
|-------|---|---|---|---|---|---|
| Label | Exploratorium, SF | RT. 101, So. SF | Rt. 101, Menlo Park | Rt. 101, Mountain View, CA | 7Eleven, Saratoga, CA | Home, Saratoga, CA |
| Long. | — | — | — | — | — | — |
| Lat.  | — | — | — | — | — | — |
| Time  | 1.00-1:30 pm | 1:45 pm | 2.00 pm | 2:15 pm | 2:30 pm | 2:45 pm |
| Date  | Jan. 1, 2002 | Jan. 1, 2002 | Jan. 1, 2002 | Jan. 1, 2002 | Jan. 1, 2002 | Jan. 1, 2002 |
| Temp. | 90 | 89 | 89 | 88 | 88 | 87 |
| Other | — | — | — | — | — | — |

As shown, the locations 1-3 in Table 1, along the path 350 as shown in FIG. 3(b), are very close to one another and such is reflected by the longitude and latitude coordinates for these locations. Hence, by examining the first 3 locations, substantially matched. Another rule can be that if two consecutive pieces of location-designation information are in the same area, point of interest or label, they are considered substantially matched.

In another embodiment, the decision 366 can be based on not only the location-designation information but also the location-related information. If two consecutive pieces of location-designation information and location-related information are substantially matched, the two information points should be combined. Different thresholds can be set to determine if location-related information from different points are substantially matched. For example, the location-related information is the temperature of the environment. One rule can be that if the temperatures of two consecutive points are close to each other, such as setting the threshold to be 3 degrees, the location-related information from the two points are considered substantially matched. Another rule can be that if the difference between two consecutive pieces of location-related information is less than a certain percent, such as 3%, of the value of the first piece of location-related information, the two pieces of location-related information are considered substantially matched.

In any case, when the decision 366 determines that some of the information points should be combined, the two or more of the information points are combined 368. On the other hand, the information points are not combined when the decision 366 determines that these information points should not be combined.

Once information points are combined, the resulting information point can be a normal information point (with perhaps additional data) or a compound information point (retaining some or all of the data of the information points being combined). For example, information under each of the locations in Table 1 can be considered information under an information point. Information points 1-3 under Table 1 are combined into information point 1 under Table 2. The new information 1 can be considered a compound information point because it retains some of the time information of points combined. In any case, the combining of information points operates to consolidate the series of information points such that the data is more compact and/or better organized.

Figure 4:
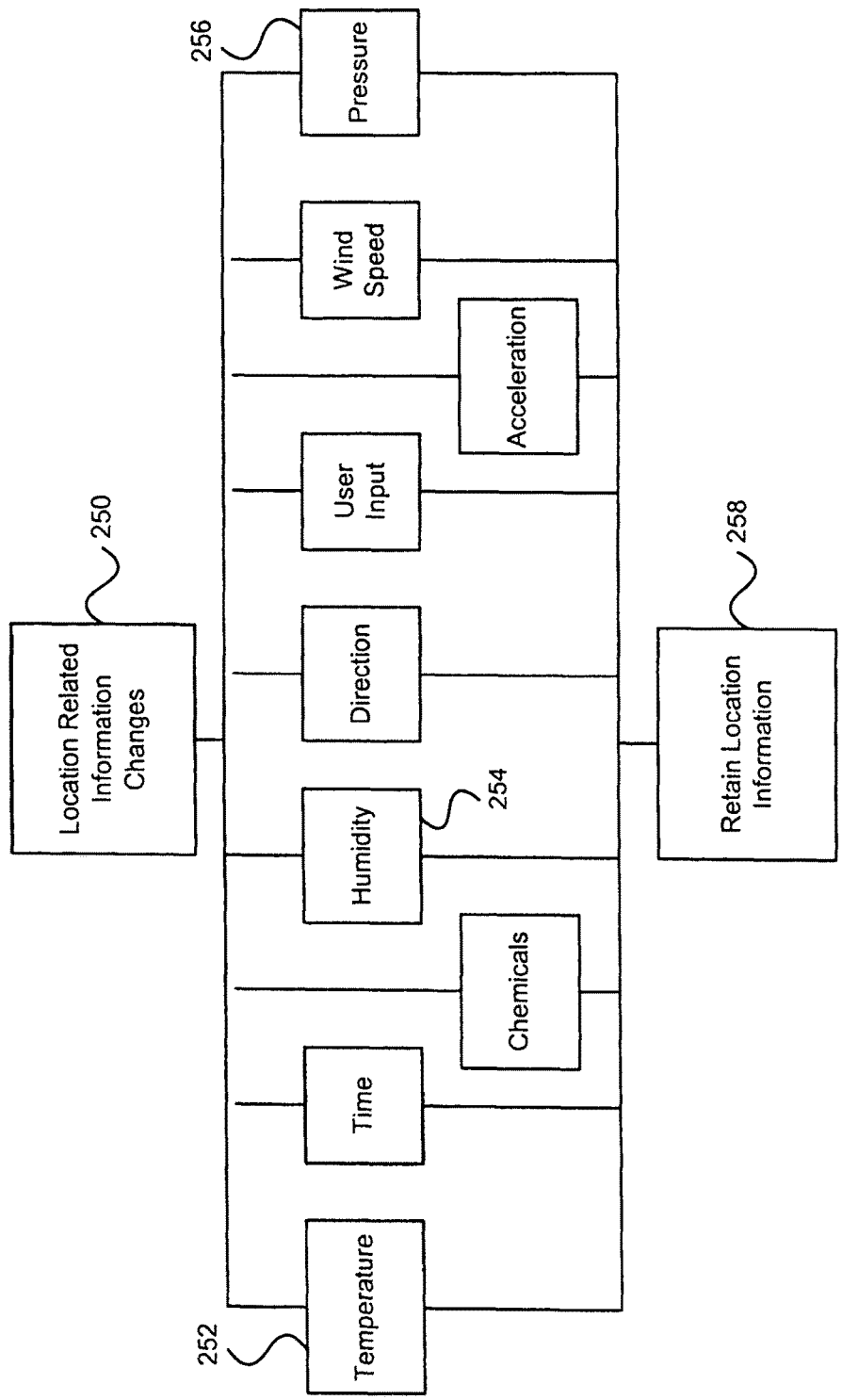
FIG. 4 shows embodiments regarding retaining location information in the present information.
Figure 5:
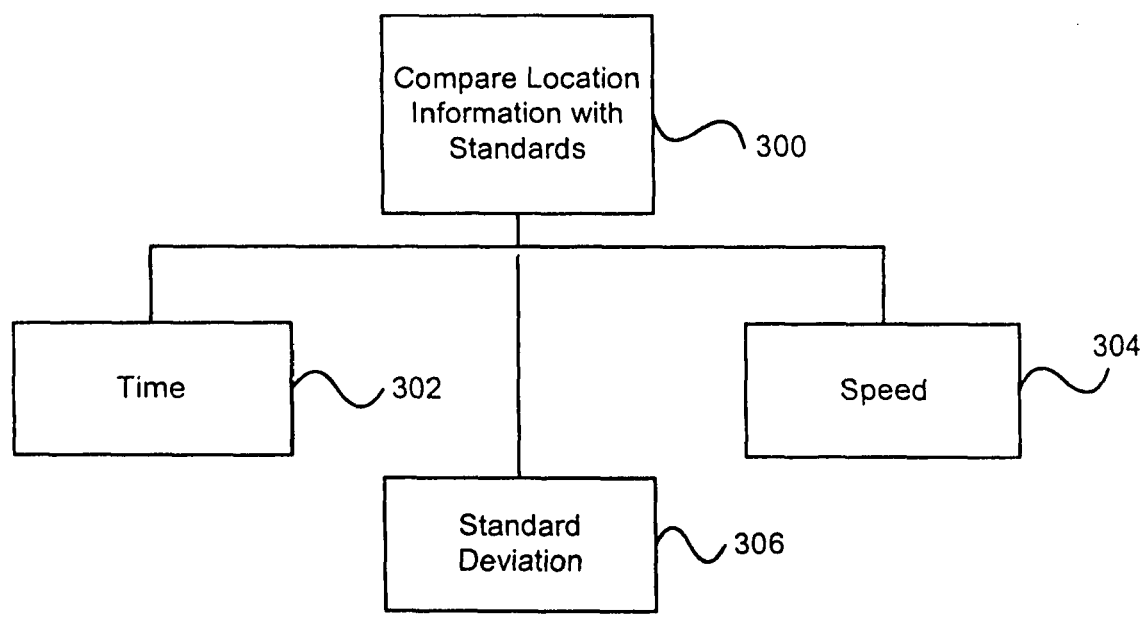
FIG. 5 shows embodiments of attaching location information to other information in the present invention.

FIG. 4 shows examples of location-related information 250 regarding consolidation. For example, the location-related information can include temperature 252, humidity 254, direction, wind speed, time, user-input, chemicals, acceleration and pressure 256. Some of the location-related information is information regarding the environment where the location-designating device is located, such as temperature, humidity, wind speed, chemicals, and atmospheric pressure, tire pressure or other types of pressures. Other of the location-related information can pertain to the location-designating device itself, such as the acceleration of the device, or the pressure being asserted on the device. Examples of other sensors to provide related information include carbon monoxide detectors, liquid sensors, metal detectors, color sensors, scent sensors, light sensors, pattern sensors, tactile sensors, sound sensors, motion detectors, smoke sensors, particle sensors and radiation detectors, such as infrared detectors. Related information can be captured by the corresponding sensors, with the related-information coupled to location-designating information. The coupling can be achieved wirelessly. For example, a chemical sensor attached to a package can transmit the amount of certain gaseous chemicals through Bluetooth or WiFi technologies to the location-designating device, which is also coupled to the package.

The following provides additional examples of location-related information that impact consolidation or compression, and are used in determining to retain location information 256. An administrator (e.g., user) can set a threshold for a location-related information. For example, a rule the administrator sets for the compressor can be: From position A to position B, if the temperature at any position changes by more than x degrees from that at point A, keep the location information at that position. Another rule can be: During any one-hour period, keep the location information where the humidity changes by, such as, more than 50% from that at the beginning of that hour. A third rule for a threshold can be that if time has elapsed by, such as, 1 hour, from the time when a piece of location information has been retained, keep the new location information. Another rule for a threshold can be that if a certain type of chemical exceeds a certain amount, keep the location information. Yet another rule can be that if a user has entered information at a specific location, keep the location information. In this case, the threshold can be set, for example, to zero or one character difference in user entry. If there is any changes in user entry, such as from not entering anything to inputting something, or to inputting something different, the location information at that position can be kept.

Figure 6:
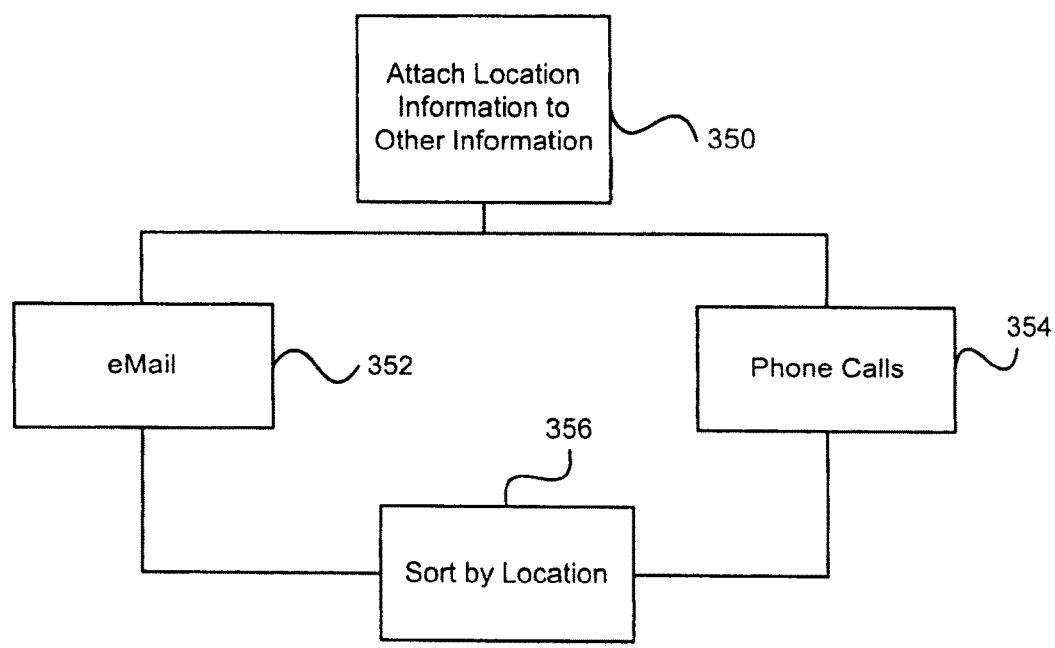
FIG. 6 shows examples of standards compared to location information in the present information.

Location information collected can be attached to other information. FIG. 6 shows a few embodiments of attaching certain location information 350 to other information. For example, labels can be attached to emails 352, phone calls 354, or other types of messages, when they are sent. Then, received emails not only indicate who sent them, they would also indicate the locations from where they were sent. Emails and phone calls can then be sorted 356 based on locations. In one embodiment, the sorting can be alphabetical, such as through the labels.

To help users digest location information, sometimes it is advantageous to compare them to standards. In one embodiment, a system of the invention includes a comparator for comparing location information with standards. FIG. 6 shows examples of standards for comparison. In one example, a label represents a five-mile strip (portion) of a specific highway. The average amount of time T 302 to travel through that five-mile strip is known. The user drives his car through the strip. The time he enters and exits that label is stored, and their difference is compared to T. If the difference is more than a pre-set threshold, a notification can be sent to the user. Similarly, the standard can be the speed 304 of a typical car traveling through that strip.

In another example, the amount of time can be that of an item on the shelf of a company, such as a supermarket. The location of that item is monitored.

Standard deviations, 306, can also be tracked. This can be the standard deviation of the travel time of a specific car through the strip during the last two months. If the standard deviation is more than a pre-set threshold, the driver can be notified.

Figure 7:
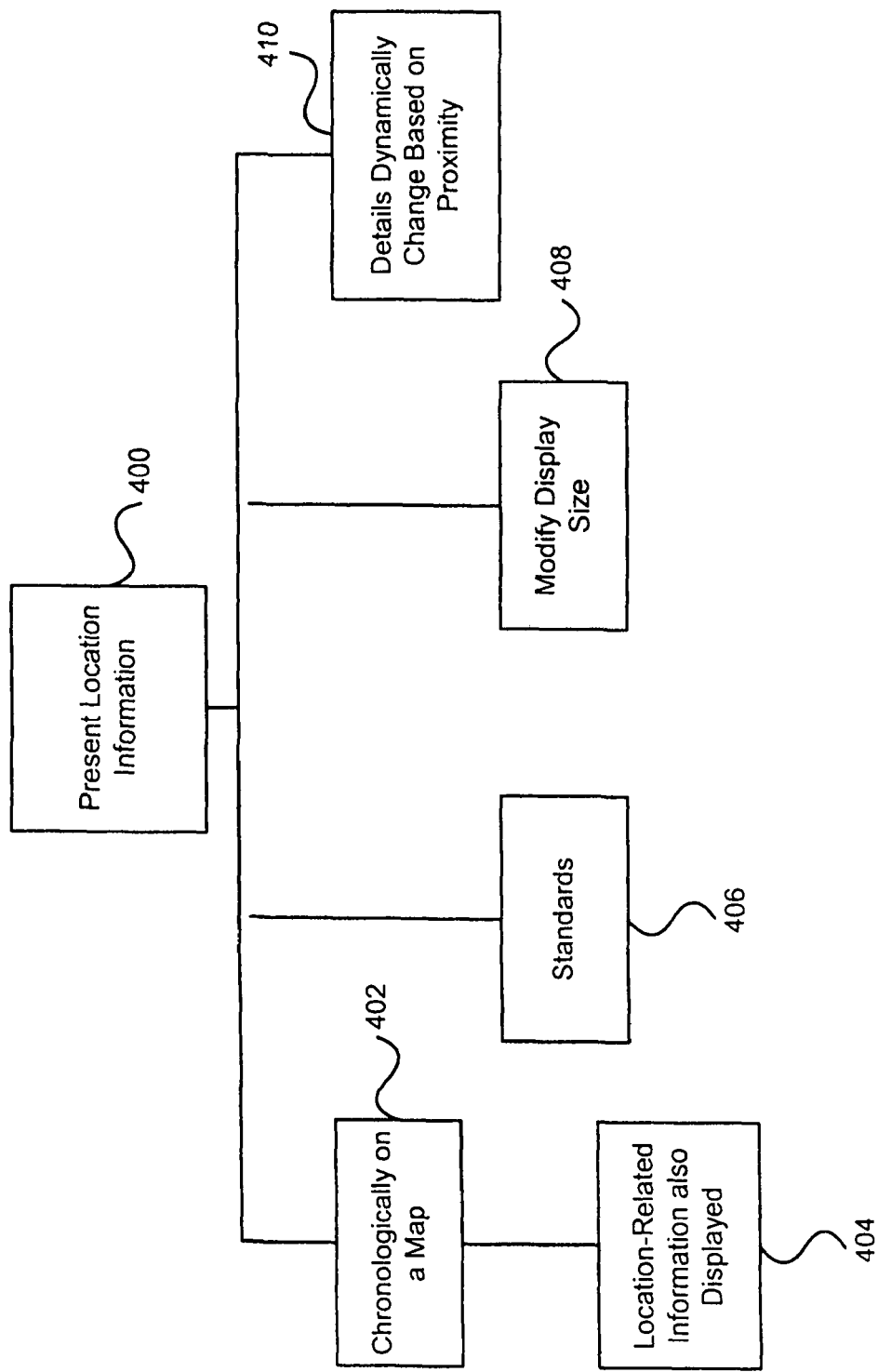
FIG. 7 shows embodiments related to the presentation of location information in the present invention.

FIG. 7 shows embodiments related to the presentation 400 of location information. In one embodiment, location information can be presented chronologically on a map 402. Location-related information can be coupled to the corresponding labels and displayed on the map 404. For example, a piano is shipped from San Francisco to Toyko. The map can show chronologically where the piano is at different times. Next to the shipping path, there can be two other line graphs, one showing the humidity, and the other showing the temperature at the corresponding location and time. The location-related information can also be coupled to the corresponding labels and displayed as a link or visual indicator which is selectable to cause the location-related information to be displayed, The presentation can be in a tabulated format, such as in a spreadsheet. Presentation can be in graphical formats, such as in bar charts or pie charts, in two or more dimensions.

Location information where a mobile device enters and exits a label can be presented. Location information where there are changes exceeding thresholds in location-related information can also be shown.

The display of location-related information can be through clickable icons 404 on a web site. For example, the user was in the Exploratorium at 4 pm. A small icon representing the Exploratorium can be displayed next to the location of the chart indicating where the user was at 4 pm. Clicking the icon would lead one to the web site of the Exploratorium.

Location information can be displayed with their standards 406. For example, a display can show the speed of a car as a function of location. Next to that, there can be another line showing standard speeds at the different locations.

In one embodiment, the display size can be modified 408. For example, the screen on a handheld device can be small. When the user is in a car, the user can dock the device, which can electronically couple the device to a larger screen in the car for viewing.

In another embodiment, the locations of a GPS device are displayed with respect to a specific location. The amount of details displayed between the locations of the GPS device and the specific location can dynamically change 410. This change can depend on the distances between the locations of the GPS device and the specific location. The amount of details can be defined as the density of the points of interest shown in an area. Points of interest can include the name of a street, the name of a park or other designations.

As an example, the number of labels shown between the locations of the GPS device and the specific location depends on the distances between the locations and the specific location. If the GPS device is very far away from the specific location, there will be many labels in between. With the display size being fixed, if all of the labels are shown, the display can be cluttered. So, very few labels should be shown. However, as the GPS device approaches the specific location, the ratio of labels being shown and the total number of labels between the locations increases. This can be done dynamically, depending on the separation distance. One way is to fix the number of labels to be shown on the display to be fewer than a predetermined number (e.g., 10). If there are more than the predetermined number of labels to be shown, certain labels can be skipped, such as every other one. If there are 100 labels, and only 10 can be shown, then every 10th label can be selected to be shown. In this example, even a label is in between the GPS device and the specific location, the label may not be displayed. In other words, whether a label between the location of the GPS device and the specific location is displayed or not depends on the distance between the location of the GPS device and the specific location. Note that whether a label is displayed or not can also depend on user preferences. The user can require a label to be shown if the label is between the location of the GPS device and the specific location.

In another example, the specific location is the location of another GPS device. That specific location can change as the other GPS device is moved.

Location information can be dynamically generated. As the GPS device moves, location information can be generated. So the presentation of location information can change as a function of time.

In a number of embodiments, a label identifies locations that are two-dimensional. However, a label can identify a three-dimensional volume. In other words, elevation coordinates can be included.

The present invention has described one or more GPS devices as location-designating devices to identify a location. However, the present invention is not limited to using one or more GPS devices to identify a location. In certain situations, other wireless or mobile devices can also serve as location-designating devices, such as devices based on GSM technologies or Wi-Fi technologies. Through the techniques of triangulation, these devices can also designate a location. Such triangulation techniques should be known to those skilled in the art.

Note that the process of transforming location coordinates into labels and the process of using additional information to help identify a location can be performed by two separate entities. In other words, a corporation can be responsible to transform location coordinates into labels. Then another corporation is responsible to clarify the location corresponding to a piece of location-designating information, using, for example, location-related information.

A number of embodiments have been described where the process of transforming location coordinates into labels or the process of compressing depends on a piece of location-related information. Note that such processes can depend on more than one piece of location-related information. Also, the multiple pieces of location-related information can be of different types. For example, the process of transforming can depend on time and a piece of information regarding the environment.

Figure 8:
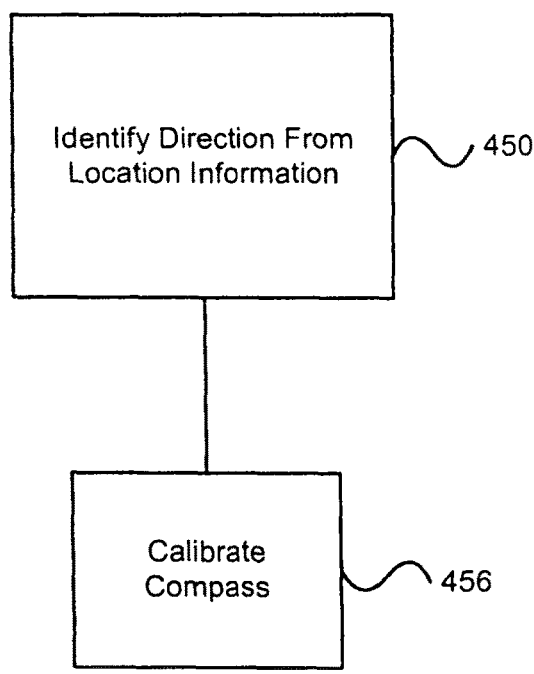
FIG. 8 shows one embodiment of using location information to calibrate a compass in the present invention.

As described above, since multiple pieces of location information from a GPS device can identify direction 450, the GPS device can be used to calibrate a digital compass, 452, as illustrated in FIG. 8. A GPS device can provide multiple location information as a function of time. If the person carrying the device is traveling along a certain constant direction, the multiple location information will be able to identify that direction. The direction information can then be used to calibrate a digital compass, as long as the compass is attached to, or traveling in the same direction as, the GPS device.

The above-described systems, devices, methods and processes can be used together with other aspects of a monitoring system, including the various aspects described in: (i) U.S. Provisional Patent Application No. 60/444,198, filed Jan. 30, 2003, and entitled "SYSTEM, METHOD AND APPARATUS FOR ACQUIRING, PRESENTING, MONITORING, DELIVERING, MANAGING AND USING STATUS INFORMATION," which is hereby incorporated herein by reference; (ii) U.S. Provisional Patent Application No. 60/418,491, filed Oct. 15, 2002, and entitled "SYSTEM, METHOD AND APPARATUS FOR ACQUIRING, PRESENTING, MONITORING, DELIVERING, MANAGING AND USING STATUS INFORMATION," which is hereby incorporated herein by reference; (iii) U.S. Provisional Patent Application No. 60/404,645, filed Aug. 19, 2002, and entitled "SYSTEM, METHOD AND APPARATUS FOR ACQUIRING, PRESENTING, MONITORING, DELIVERING, MANAGING AND USING POSITION AND OTHER INFORMATION," which is hereby incorporated herein by reference; and (iv) U.S. Provisional Patent Application No. 60/375,998, filed Apr. 24, 2002, and entitled "SYSTEM, METHOD AND APPARATUS FOR ACQUIRING, PRESENTING, MANAGING AND USING POSITION INFORMATION," which is hereby incorporated herein by reference.

The various embodiments, implementations, features and aspects of the invention noted above (including those incorporated by reference) can be combined in various ways or used separately. Those skilled in the art will understand from the description that the invention can be equally applied to or used in other various different settings with respect to various combinations, embodiments, implementations or features provided in the description herein.

The invention can be implemented in software, hardware or a combination of hardware and software. The invention, or at least certain software portions of the invention, can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

The invention claimed is:

1. A computer-implemented method operable to at least facilitate electronic presentation of data regarding locations and movement of at least a mobile electronic device on a display of the mobile electronic device, the mobile electronic device including a satellite-signal receiver and a wireless-signal sensor, the computer-implemented method comprising:
    accessing data regarding a first location of the mobile electronic device determined based on at least analyzing data from a first measurement and analyzing data from a second measurement, so that the first location of the mobile device is more accurately determined than just based on analyzing data from the first measurement, with the first location of the mobile electronic device being associated with a time;
    presenting a symbol at a first position on a map on the display of the mobile electronic device, with the first position on the map being based on the first location of the mobile electronic device;
    accessing data regarding a plurality of locations of the mobile electronic device to track a movement of the mobile electronic device towards a specific location;
    changing position of the symbol presented on the display due to a change in location of the mobile electronic device; and
    changing ratio of points of interest presented and points of interest available to be presented on the display, along with presenting the symbol, based on the tracked movement of the mobile electronic device, as the mobile electronic device moves towards the specific location,
    wherein the first measurement is from the satellite-signal receiver configured to receive signals that can identify location, with the signals from a plurality of satellites,
    wherein the second measurement is from the wireless-signal sensor configured to sense wireless signals that can identify location, with the signals being in the vicinity of the mobile electronic device, with the signals not from satellites, and with at least a portion of the signals in the GHz range,
    wherein the at least a portion of the signals in the GHz range includes Wi-Fi signals, and
    wherein the mobile electronic device is operable as a phone.

2. A computer-implemented method as recited in claim 1 comprising:
    presenting, on the display, a path of travel of the mobile electronic device;
    presenting comments, on the display, related to a position of the mobile electronic device;
    presenting the time on the display;
    receiving, at the mobile electronic device, a message from a user of the mobile electronic device; and
    sending wirelessly, by the mobile electronic device, the message from the user, with the message including text, wherein at least a point of interest is the name of a street.

3. A computer-implemented method as recited in claim 2 comprising:
    accessing data regarding direction of movement of the mobile electronic device as the mobile electronic device moves,
    wherein at least some of the presentations of the symbol on the display depend on the direction of movement of the mobile electronic device.

4. A non-transitory computer readable medium including at least executable computer program code stored therein at least for presenting data regarding locations and movement of at least a mobile electronic device on a display of the mobile electronic device, the computer readable medium comprising:
    computer program code for accessing data regarding a first location of the mobile electronic device based on at least analyzing outputs from a satellite-signal receiver, at least partially in the mobile electronic device, configured to receive signals that can identify location, with the signals from a plurality of satellites;
    computer program code for accessing data regarding the first location of the mobile electronic device based on at least analyzing outputs from a wireless-signal sensor, at least partially in the mobile electronic device, configured to receive wireless signals that can identify location, with the signals being in the vicinity of the mobile electronic device, and with the signals not from satellites;
    computer program code for presenting a symbol at a first position on a map on the display, with the first position on the map being based on the first location of the mobile electronic device;
    computer program code for accessing data regarding a plurality of locations of the mobile electronic device to track a movement of the mobile electronic device towards a specific location; and
    computer program code for changing ratio of points of interest presented and points of interest available to be presented on the display, along with presenting the symbol, based on the tracked movement of the mobile electronic device, as the mobile electronic device moves towards the specific location, wherein the first location of the mobile electronic device is associated with a time,
    wherein at least a portion of the wireless signals received by the wireless-signal receiver includes Wi-Fi signals, and
    wherein the mobile electronic device is operable as a phone.

5. A non-transitory computer readable medium as recited in claim 4, wherein the first location of the mobile electronic device is determined based on at least analyzing outputs from the satellite-signal receiver and analyzing outputs from the wireless-signal sensor, so that the first location of the mobile device is more accurately determined than just based on analyzing outputs from the satellite-signal receiver.

6. A non-transitory computer readable medium as recited in claim 5, wherein the data regarding the first location of the mobile electronic device depends on data regarding a physical layout in proximity to the mobile electronic device.

7. A non-transitory computer readable medium as recited in claim 6, wherein the data regarding the physical layout includes data regarding a 3D layout of buildings structures in proximity to the mobile electronic device.

8. A non-transitory computer readable medium as recited in claim 7 comprising:
   computer program code for presenting, on the display, comments related to a position of the mobile electronic device;
   computer program code for presenting, on the display, the time; and
   computer program code for presenting, on the display, a path of travel of the mobile electronic device,
   wherein at least a point of interest is the name of a street.

9. A non-transitory computer readable medium as recited in claim 8 comprising:
   computer program code for changing position of the symbol presented on the display due to a movement of the mobile electronic device;
   computer program code for receiving a message from a user of the mobile electronic device;
   computer program code for sending wirelessly, by the mobile electronic device, the message from the user; and
   computer program code for presenting, on the display, at least a message including text, from a person.

10. A non-transitory computer readable medium as recited in claim 5, wherein the computer readable medium comprises:
    computer program code for presenting, on the display, comments related to position; and
    computer program code for presenting the time on the display.

11. A non-transitory computer readable medium as recited in claim 10, wherein the comments are related to a position of the mobile electronic device on the display.

12. A non-transitory computer readable medium as recited in claim 5, wherein at least a point of interest is the name of a street.

13. A non-transitory computer readable medium as recited in claim 5,
    wherein the computer readable medium comprises computer program code for accessing data regarding direction of movement of the mobile electronic device as the mobile electronic device moves, and
    wherein at least some of the presentations of the symbol on the display depend on the direction of movement of the mobile electronic device.

14. A non-transitory computer readable medium as recited in claim 5, wherein the computer readable medium comprises:
    computer program code for receiving, at the mobile electronic device, a message from a user of the mobile electronic device; and
    computer program code for sending wirelessly, by the mobile electronic device, the message from the user.

15. A non-transitory computer readable medium as recited in claim 14, wherein the computer readable medium comprises computer program code for presenting on the display at least a message from a person, and the message includes text.

16. A non-transitory computer readable medium as recited in claim 15 comprising:
    computer program code for presenting, on the display, comments related to a position of the mobile electronic device;
    computer program code for presenting, on the display, the time; and
    computer program code for presenting, on the display, a path of travel of the mobile electronic device,
    wherein at least a point of interest is the name of a street.

17. A non-transitory computer readable medium as recited in claim 16 comprising:
    computer program code for accessing data regarding direction of movement of the mobile electronic device as the mobile electronic device moves; and
    computer program code for changing position of the symbol presented on the display due to a movement of the mobile electronic device,
    wherein at least some of the presentations of the symbol on the display depend on the direction of movement of the mobile electronic device.

18. A non-transitory computer readable medium as recited in claim 5, wherein the data regarding the first location of the mobile electronic device depends on data regarding where the mobile electronic device was previously determined to be located.

19. A non-transitory computer readable medium as recited in claim 5 comprising:
    computer program code for presenting, on the display, comments related to a position of the mobile electronic device;
    computer program code for presenting, on the display, the time; and
    computer program code for presenting, on the display, a path of travel of the mobile electronic device,
    wherein at least a point of interest is the name of a street.

20. A non-transitory computer readable medium as recited in claim 19 comprising computer program code for:
    accessing data regarding direction of movement of the mobile electronic device as the mobile electronic device moves; and
    changing position of the symbol presented on the display due to a movement of the mobile electronic device,
    wherein at least some of the presentations of the symbol on the display depend on the direction of movement of the mobile electronic device.

21. A non-transitory computer readable medium including at least executable computer program code stored therein at least for presenting data regarding locations and movement of at least a mobile electronic device on a display of the mobile electronic device, the computer readable medium comprising:
    computer program code for accessing data regarding a first location of the mobile electronic device based on at least analyzing outputs from a satellite-signal receiver, at least partially in the mobile electronic device, configured to receive signals that can identify location, with the signals from a plurality of satellites;
    computer program code for accessing data regarding the first location of the mobile electronic device based on at least analyzing outputs from a wireless-signal sensor, at least partially in the mobile electronic device;

computer program code for presenting a symbol at a first position on a map on the display, with the first position on the map being based on the first location of the mobile electronic device;

computer program code for accessing data regarding a plurality of locations of the mobile electronic device to track a movement of the mobile electronic device towards a specific location;

computer program code for changing ratio of points of interest presented and points of interest available to be presented on the display, along with presenting the symbol, based on the tracked movement, as the mobile electronic device moves towards the specific location;

computer program code for presenting, on the display, comments related to a position of the mobile electronic device;

computer program code for presenting a time on the display, with the time associated with the first location of the mobile electronic device;

computer program code for accessing data regarding direction of movement of the mobile electronic device as the mobile electronic device moves;

computer program code for presenting, on the display, a path of travel of the mobile electronic device; and computer program code for presenting on the display at least a message including text, from a person, wherein the first location of the mobile electronic device is determined based on at least analyzing outputs from the satellite-signal receiver and analyzing outputs from the wireless-signal sensor, so that the first location of the mobile device is more accurately determined than just based on analyzing outputs from the satellite-signal receiver, wherein the mobile electronic device is operable as a phone, wherein the data regarding the first location of the mobile electronic device depends on data regarding a 3D layout of, structures in proximity to the mobile electronic device, wherein at least some of the presentations of the symbol on the display depend on the direction of movement of the mobile electronic device, and wherein at least a point of interest is the name of a street.

22. A non-transitory computer readable medium as recited in claim 21, wherein the computer readable medium comprises:

computer program code for changing position of the symbol presented on the display due to a movement of the mobile electronic device;

computer program code for receiving, at the mobile electronic device, a message from a user of the mobile electronic device; and computer program code for sending wirelessly, by the mobile electronic device, the message from the user.

23. A non-transitory computer readable medium including at least executable computer program code stored therein at least for presenting data regarding locations and movement of at least a mobile electronic device on a display of the mobile electronic device, the computer readable medium comprising:

computer program code for accessing data regarding a first location of the mobile electronic device based on at least analyzing outputs from a satellite-signal receiver, at least partially in the mobile electronic device, configured to receive signals that can identify location, with the signals from a plurality of satellites;

computer program code for accessing data regarding the first location of the mobile electronic device based on at least analyzing outputs from a wireless-signal sensor, at least partially in the mobile electronic device, configured to receive wireless signals that can identify location, with the signals being in the vicinity of the mobile electronic device, and with the signals not from satellites;

computer program code for presenting, on the display, a symbol at a first position on a map, with the first position on the map being based on the first location of the mobile electronic device;

computer program code for accessing data regarding a plurality of locations of the mobile electronic device to track a movement of the mobile electronic device towards a specific location;

computer program code for changing ratio of points of interest presented and points of interest available to be presented on the display, along with presenting the symbol, based on the tracked movement of the mobile electronic device, as the mobile electronic device moves towards the specific location;

computer program code for presenting, on the display, comments related to a position of the mobile electronic device;

computer program code for presenting a time on the display, with the time associated with the first location of the mobile electronic device;

computer program code for accessing data regarding direction of movement of the mobile electronic device as the mobile electronic device moves;

computer program code for presenting, on the display, a path of travel of the mobile electronic device;

computer program code for presenting on the display at least a message including text, from a person;

computer program code for receiving, at the mobile electronic device, a message from a user of the mobile electronic device; and computer program code for sending wirelessly, by the mobile electronic device, the message from the user, wherein the first location of the mobile electronic device is determined based on at least analyzing outputs from the satellite-signal receiver and analyzing outputs from the wireless-signal sensor, so that the first location of the mobile device is more accurately determined than just based on analyzing outputs from the satellite-signal receiver, wherein the mobile electronic device is operable as a phone, wherein at least some of the presentations of the symbol on the display depend on the direction of movement of the mobile electronic device, and wherein at least a point of interest is the name of a street.

24. A non-transitory computer readable medium as recited in claim 23, wherein the computer readable medium comprises computer program code for changing position of the symbol presented on the display due to a movement of the mobile electronic device, and wherein the wireless-signal sensor is configured to sense at least Bluetooth signals.

25. A non-transitory computer readable medium including at least executable computer program code stored therein at least for presenting data regarding locations and movement of at least an apparatus, the computer readable medium comprising:

computer program code for accessing data regarding a first location of the apparatus based on at least (a) analyzing outputs from a satellite-signal receiver, at least partially in or coupled to the apparatus, configured to receive signals that can identify location, with the signals from a plurality of satellites, and (b) analyzing outputs from a plurality of additional sensors, at least partially in or coupled to the apparatus, configured to receive wireless signals that can identify location, with the signals being in the vicinity of the apparatus, and with the signals not being from satellites;

computer program code for presenting a symbol at a first position on a map on a display, with the first position on the map being based on the first location of the apparatus;

computer program code for accessing data regarding a plurality of locations of the apparatus to track a movement of the apparatus towards a specific location; and computer program code for changing ratio of points of interest presented and points of interest available to be presented on the display, along with presenting the symbol, based on the tracked movement of the apparatus, as the apparatus moves towards the specific location, wherein the first location of the apparatus is associated with a time, and wherein the first location of the apparatus is determined based on at least analyzing outputs from the satellite-signal receiver and analyzing outputs from the plurality of additional sensors, so that the first location of the apparatus is more accurately determined than just based on analyzing outputs from the satellite-signal receiver.

26. A non-transitory computer readable medium as recited in claim 25, wherein the data regarding the first location of the apparatus depends on data regarding where the apparatus was previously determined to be located.

27. A non-transitory computer readable medium as recited in claim 26, wherein the data regarding the first location of the apparatus depends on data regarding a physical layout in proximity to the apparatus.

28. A non-transitory computer readable medium as recited in claim 27, wherein the data regarding the physical layout includes data regarding a 3D layout of structures in proximity to the apparatus.

29. A non-transitory computer readable medium as recited in claim 26, wherein the computer readable medium comprises:
computer program code for presenting, on the display, comments related to position; and
computer program code for presenting the time on the display.

30. A non-transitory computer readable medium as recited in claim 29, wherein the comments are related to a position of the apparatus on the display.

31. A non-transitory computer readable medium as recited in claim 26, wherein the computer readable medium comprises computer program code for accessing data regarding direction of movement of the apparatus as the apparatus moves.

32. A non-transitory computer readable medium as recited in claim 25, wherein the data regarding the first location of the apparatus depends on data regarding a physical layout in proximity to the apparatus.

33. A non-transitory computer readable medium as recited in claim 26 comprising:
computer program code for presenting, on the display, comments related to a position of the apparatus;
computer program code for presenting, on the display, the time; and
computer program code for presenting, on the display, a path of travel of the apparatus,
wherein at least a point of interest is the name of a street.

34. A non-transitory computer readable medium as recited in claim 33 comprising computer program code for:
accessing data regarding direction of movement of the apparatus as the apparatus moves; and
changing position of the symbol presented on the display due to a movement of the apparatus.

35. A non-transitory computer readable medium as recited in claim 34, wherein the apparatus includes electronics operable to enable a person to use the apparatus to wirelessly communicate with another person.

36. A non-transitory computer readable medium as recited in claim 34, wherein the additional sensors include at least a sensor configured to receive signals in optical frequencies.

37. A non-transitory computer readable medium as recited in claim 28 comprising:
computer program code for presenting, on the display, comments related to a position of the apparatus;
computer program code for presenting, on the display, the time; and
computer program code for presenting, on the display, a path of travel of the apparatus,
wherein at least a point of interest is the name of a street.

38. A non-transitory computer readable medium as recited in claim 37 comprising computer program code for:
accessing data regarding direction of movement of the apparatus as the apparatus moves; and
changing position of the symbol presented on the display due to a movement of the apparatus.

39. A non-transitory computer readable medium as recited in claim 32, wherein the data regarding the physical layout includes data regarding a 3D layout of structures in proximity to the apparatus.

40. A non-transitory computer readable medium as recited in claim 39, wherein the apparatus is attached to a vehicle.

41. A non-transitory computer readable medium as recited in claim 39, wherein the apparatus is attached to a moving container.

42. A non-transitory computer readable medium as recited in claim 39 comprising computer program code for transforming the first location to an address of a physical place.

43. A non-transitory computer readable medium including at least executable computer program code stored therein at least for presenting data regarding locations and movement of at least an apparatus, the computer readable medium comprising:
computer program code for accessing data regarding a first location of the apparatus based on at least (a) analyzing outputs from a satellite-signal receiver, at least partially in or coupled to the apparatus, configured to receive signals that can identify location, with the signals from a plurality of satellites, and (b) analyzing outputs from a plurality of additional sensors, at least partially in or coupled to the apparatus, configured to receive wireless signals that can identify location, with the signals being in the vicinity of the apparatus, and with the signals not being from satellites;
computer program code for presenting a symbol at a first position on a map on a display, with the first position on the map being based on the first location of the apparatus; and
computer program code for accessing data regarding a plurality of locations of the apparatus to track a movement of the apparatus towards a specific location,
wherein the data regarding the first location of the apparatus depends on data regarding a physical layout in proximity to the apparatus, wherein the first location of the apparatus is associated with a time, and wherein the first location of the apparatus is determined based on at least analyzing outputs from the satellite-signal receiver and analyzing outputs from the plurality of additional sensors, so that the first location of the apparatus is more accurately determined than just based on analyzing outputs from the satellite-signal receiver.

44. A non-transitory computer readable medium as recited in claim 43, wherein the data regarding the physical layout includes data regarding a 3D layout of structures in proximity to the apparatus.

45. A non-transitory computer readable medium as recited in claim 43, wherein the data regarding the first location of the apparatus depends on data regarding where the apparatus was previously determined to be located.

46. A non-transitory computer readable medium as recited in claim 43, wherein the data regarding the first location of the apparatus depends on data regarding a direction of travel of the apparatus.

47. A non-transitory computer readable medium as recited in claim 43, wherein the additional sensors include at least a sensor configured to receive signals in optical frequencies.

48. A non-transitory computer readable medium as recited in claim 43, wherein the apparatus is attached to a moving container.

49. A non-transitory computer readable medium as recited in claim 43 comprising computer program code for generating notification based on at least an output from at least one of the additional sensors exceeding a pre-set threshold.

50. A non-transitory computer readable medium as recited in claim 49 comprising computer program code for accessing data regarding a location and a time, wherein the location and the time correspond to where and when the at least an output from at least one of the additional sensors exceeding the pre-set threshold.

51. A non-transitory computer readable medium as recited in claim 44, wherein the data regarding the first location of the apparatus depends on data regarding where the apparatus was previously determined to be located, and wherein the additional sensors include at least a sensor configured to receive signals in optical frequencies.

52. A non-transitory computer readable medium as recited in claim 51, wherein the apparatus is attached to a moving container.

53. A non-transitory computer readable medium as recited in claim 52, wherein the data regarding the first location of the apparatus depends on data regarding a direction of travel of the apparatus.

54. A non-transitory computer readable medium as recited in claim 53 comprising:
computer program code for generating notification based on at least an output from at least one of the additional sensors exceeding a pre-set threshold;
and computer program code for accessing data regarding a location and a time, wherein the location and the time correspond to where and when the at least an output from at least one of the additional sensors exceeding the pre-set threshold.

55. A non-transitory computer readable medium as recited in claim 54 comprising computer program code for transforming the first location to an address of a physical place.

* * * * *

UNITED STATES PATENT AND TRADEMARK OFFICE
CERTIFICATE OF CORRECTION

PATENT NO. : 10,652,690 B2  
APPLICATION NO. : 15/634019  
DATED : May 12, 2020  
INVENTOR(S) : Lau et al.

Page 1 of 1

It is certified that error appears in the above-identified patent and that said Letters Patent is hereby corrected as shown below:

In the Claims  
Column 17, Line 12 (Claim 7): "buildings structures" should be --structures--

Signed and Sealed this  
Eleventh Day of August, 2020

Andrei Iancu  
*Director of the United States Patent and Trademark Office*